(12) United States Patent
Khan et al.

(10) Patent No.: US 11,120,511 B2
(45) Date of Patent: Sep. 14, 2021

(54) SYSTEM AND METHOD FOR UNIVERSAL CARD ACCEPTANCE

(71) Applicant: Samsung Electronics Co., Ltd, Suwon-si (KR)

(72) Inventors: Hashir Khan, Mountain View, CA (US); Bulent Kasman, Mountain View, CA (US); Geng Chen, Mountain View, CA (US); Chirayu Shah, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 15/659,490

(22) Filed: Jul. 25, 2017

(65) Prior Publication Data

US 2018/0033090 A1 Feb. 1, 2018

Related U.S. Application Data

(60) Provisional application No. 62/366,981, filed on Jul. 26, 2016.

(51) Int. Cl.
*G06Q 40/00* (2012.01)
*G06Q 20/32* (2012.01)
(Continued)

(52) U.S. Cl.
CPC .......... *G06Q 40/12* (2013.12); *G06Q 20/227* (2013.01); *G06Q 20/24* (2013.01); *G06Q 20/26* (2013.01);
(Continued)

(58) Field of Classification Search
CPC ..................................................... G06Q 40/00
(Continued)

(56) References Cited

U.S. PATENT DOCUMENTS 4,630,201 A * 12/1986 White ................... G06Q 20/04
235/379
6,260,027 B1 * 7/2001 Takahashi .............. G06Q 20/02
705/64

(Continued)

FOREIGN PATENT DOCUMENTS

| EP | 2602980 A1 | 6/2013 |
|----|---|---|
| JP | 2011065199 A | 3/2011 |
| WO | WO2013067507 A1 | 5/2013 |

OTHER PUBLICATIONS

International Search Report and Written Opinion for International Application No. PCT/KR2017/008070, dated Oct. 31, 2017. (12 pages).

(Continued)

*Primary Examiner* — Kirsten S Apple

(57) ABSTRACT

A method, electronic device, and non-transitory computer readable medium for transmitting information is provided. The method includes creating a card network account for each card network of a plurality of card networks. The method also includes associating with a digital card the created card network accounts and providing to at least one of the card network accounts an account balance of the digital card. Additionally, the method includes receiving, from a mobile device, a selection of the digital card to conduct a transaction at a location. The method also includes providing a suggested card network, determined from the plurality of card networks, to the mobile device, to conduct the transaction. The suggested card network is based in part on which card networks accepted at the location. The method also includes updating the account balance of the digital card on completion of the transaction.

20 Claims, 11 Drawing Sheets

(51) Int. Cl.
| | |
|---|---|
| *G06Q 20/34* | (2012.01) |
| *G06Q 20/22* | (2012.01) |
| *G06Q 20/36* | (2012.01) |
| *G06Q 20/24* | (2012.01) |
| *G06Q 20/26* | (2012.01) |

(52) U.S. Cl.
CPC ..... *G06Q 20/3223* (2013.01); *G06Q 20/3278* (2013.01); *G06Q 20/351* (2013.01); *G06Q 20/355* (2013.01); *G06Q 20/3676* (2013.01)

(58) Field of Classification Search
USPC .......................................................... 705/38
See application file for complete search history.

(56) References Cited

U.S. PATENT DOCUMENTS

| | | | |
|---|---|---|---|
| 7,099,850 B1* | 8/2006 | Mann, II | G06Q 20/16 380/28 |
| 7,689,508 B2* | 3/2010 | Davis | G06Q 20/10 455/406 |
| 7,962,407 B2 | 6/2011 | Bishop et al. | |
| 8,452,654 B1* | 5/2013 | Woofers | G06Q 30/0234 705/14.34 |
| 8,533,857 B2 | 9/2013 | Tuchman et al. | |
| 8,583,549 B1* | 11/2013 | Mohsenzadeh | G06Q 20/227 705/39 |
| 8,606,640 B2* | 12/2013 | Brody | G06Q 20/0655 705/26.1 |
| 8,660,903 B1* | 2/2014 | Croak | G06Q 30/0641 705/26.1 |
| 8,966,075 B1* | 2/2015 | Chickering | H04L 12/4641 709/220 |
| 9,070,127 B2 | 6/2015 | Pitroda et al. | |
| 9,324,002 B2* | 4/2016 | Ryan | G06K 9/46 |
| 9,330,389 B2 | 5/2016 | Pitroda et al. | |
| 2001/0051915 A1* | 12/2001 | Ueno | G06Q 20/04 705/39 |
| 2004/0122685 A1* | 6/2004 | Bunce | G06Q 20/04 705/67 |
| 2005/0160038 A1* | 7/2005 | Albornoz | G06Q 20/10 705/42 |
| 2005/0250538 A1* | 11/2005 | Narasimhan | G06Q 20/12 455/558 |
| 2006/0208065 A1* | 9/2006 | Mendelovich | G06Q 20/04 235/380 |
| 2007/0255564 A1* | 11/2007 | Yee | G10L 17/24 704/246 |
| 2008/0010190 A1* | 1/2008 | Rackley, III | G06Q 20/042 705/39 |
| 2008/0116264 A1* | 5/2008 | Hammad | G06Q 20/045 235/382 |
| 2008/0270293 A1* | 10/2008 | Fortune | G06Q 10/00 705/38 |
| 2009/0119183 A1* | 5/2009 | Azimi | G06Q 20/102 705/26.1 |
| 2009/0240626 A1* | 9/2009 | Hasson | G06Q 20/10 705/75 |
| 2010/0069092 A1* | 3/2010 | Bajpai | H04W 4/022 455/456.3 |
| 2010/0191570 A1* | 7/2010 | Michaud | G06Q 30/02 705/7.33 |
| 2010/0205091 A1* | 8/2010 | Graziano | G06Q 20/102 705/40 |
| 2010/0299253 A1* | 11/2010 | Patterson | G06Q 10/06 705/40 |
| 2011/0145111 A1* | 6/2011 | Ljunggren | G06Q 20/10 705/30 |
| 2011/0191161 A1* | 8/2011 | Dai | G06Q 20/204 705/14.38 |
| 2011/0201306 A1* | 8/2011 | Ali Al-Harbi | G06F 21/42 455/411 |
| 2011/0276418 A1* | 11/2011 | Velani | G06Q 20/20 705/16 |
| 2011/0288922 A1* | 11/2011 | Thomas | G06Q 30/02 705/14.23 |
| 2011/0313837 A1 | 12/2011 | Katz et al. | |
| 2012/0271712 A1* | 10/2012 | Katzin | G06Q 30/06 705/14.51 |
| 2012/0290376 A1* | 11/2012 | Dryer | G06Q 20/3278 705/14.23 |
| 2013/0024281 A1 | 1/2013 | Walker et al. | |
| 2013/0030934 A1* | 1/2013 | Bakshi | G06Q 20/40 705/18 |
| 2013/0048714 A1* | 2/2013 | Sharma | G06Q 20/346 235/379 |
| 2013/0054484 A1 | 2/2013 | Hoeflinger et al. | |
| 2013/0124349 A1 | 5/2013 | Khan et al. | |
| 2013/0126607 A1* | 5/2013 | Behjat | G06Q 20/3274 235/380 |
| 2013/0144789 A1 | 6/2013 | Aaltonen et al. | |
| 2013/0152185 A1 | 6/2013 | Singh et al. | |
| 2014/0012701 A1* | 1/2014 | Wall | G06Q 20/383 705/26.8 |
| 2014/0025576 A1* | 1/2014 | Esch | G06Q 20/20 705/44 |
| 2014/0058927 A1 | 2/2014 | Schwarzkopf | |
| 2014/0149285 A1* | 5/2014 | De | G06Q 20/3276 705/41 |
| 2014/0164082 A1* | 6/2014 | Sun | G06Q 30/0214 705/14.16 |
| 2014/0222597 A1 | 8/2014 | Nadella et al. | |
| 2014/0236767 A1* | 8/2014 | Duggal | G07G 1/0081 705/26.61 |
| 2014/0244365 A1* | 8/2014 | Price | G07B 15/00 705/13 |
| 2014/0258102 A1 | 9/2014 | Hirka et al. | |
| 2015/0006271 A1* | 1/2015 | Oppenheim | G06Q 30/06 705/14.23 |
| 2015/0088674 A1* | 3/2015 | Flurscheim | G06Q 20/3276 705/17 |
| 2015/0100418 A1 | 4/2015 | Gangi | |
| 2015/0106180 A1 | 4/2015 | Sanghavi et al. | |
| 2015/0154621 A1 | 6/2015 | Taylor et al. | |
| 2015/0180802 A1* | 6/2015 | Chen | H04L 49/602 370/390 |
| 2015/0186871 A1* | 7/2015 | Laracey | G06Q 20/3278 705/41 |
| 2015/0220924 A1* | 8/2015 | Bakker | G06Q 20/4014 705/14.27 |
| 2015/0235196 A1* | 8/2015 | Zhu | G06Q 20/38 705/17 |
| 2015/0262266 A1 | 9/2015 | Curtis et al. | |
| 2015/0332252 A1* | 11/2015 | Shahrokhi | G06Q 20/3278 705/41 |
| 2016/0012430 A1* | 1/2016 | Chandrasekaran | G06Q 20/385 705/44 |
| 2016/0026999 A1* | 1/2016 | Kurian | G06Q 40/00 705/44 |
| 2016/0055513 A1 | 2/2016 | Kuhn et al. | |
| 2016/0140566 A1 | 5/2016 | Baker et al. | |
| 2016/0162882 A1 | 6/2016 | McClung, III | |
| 2016/0267582 A1* | 9/2016 | West | G06Q 30/0205 |
| 2017/0185996 A1* | 6/2017 | Parekh | G06K 19/0723 |
| 2017/0270491 A1* | 9/2017 | Cage | G07F 17/3209 |
| 2018/0033090 A1* | 2/2018 | Khan | G06Q 40/12 |

OTHER PUBLICATIONS

Business Insider Intelligence, "Android Pay launches recurring incentive program in the UK", Business Insider, Jun. 23, 2016, 2 pages. http://www.businessinsider.com/android-pay-launches-recurring-incentive-program-in-the-uk-2016-6.

Chavez, "Check your email: Samsung is sending $50 e-gift cards if you activated Samsung Pay during promo period", Phandroid.com, Dec. 8, 2016, 3 pages. http://phandroid.com/2015/12/08/samsung-sends-out-50-dollar-best-by-gift-card-for-activating-samsung-pay/.

(56) References Cited

OTHER PUBLICATIONS

Dipane, "You can score a $20 Best Buy e-gift card for using Android Pay on your Nexus before Dec. 31", Mobile Nations, Dec. 15, 2015, 2 pages. https://www.androidcentral.com/you-can-score-20-best-buy-e-gift-card-using-android-pay-december-31.

Gunther, "3 Good Reasons to Use Samsung Pay", GottaBe Mobile, Mar. 29, 2016, 15 pages. https://www.gottabemobile.com/2016/03/29/3-good-reasons-to-use-samsung-pay/.

Knight, "The Evolution of Digital Wallets Continues", Milken Institute, Jun. 1, 2015, 5 pages. http://www.milkeninstitute.org/blog/view/783.

Russell, "Use Android Pay and you could get a free Chromecast", TechnoBuffalo LLC, Jan. 16, 2016, 4 pages. https://www.technobuffalo.com/2016/01/16/android-pay-tap-10-promotion/.

\* cited by examiner

SYSTEM AND METHOD FOR UNIVERSAL CARD ACCEPTANCE

CROSS-REFERENCE TO RELATED APPLICATION AND CLAIM OF PRIORITY

This application claims priority under 35 U.S.C. § 119(e) to U.S. Provisional Patent Application No. 62/366,981 filed on Jul. 26, 2016. The above-identified provisional patent application is hereby incorporated by reference in its entirety.

TECHNICAL FIELD

This disclosure relates generally to mobile payments. More specifically, this disclosure relates to the management and use of a universal digital open loop cash and reward card in an electronic commerce environment.

BACKGROUND

Mobile payments refers to payment services which are generally operated under a financial regulation and performed using a compatible mobile device, such as certain smart phones, certain mobile devices and certain wearable devices. In recent years mobile payment platforms are becoming more widespread with the advent of services such as Apple Pay™, Samsung Pay™, Android Pay™, etc. Such services allow a user to make payments using a compatible device via a wireless transmission of payment information at a point of sale (POS) terminal. Generally, payment information includes one or more physical cards issued to card holders, digitized and secured in a digital wallet.

SUMMARY

Embodiments of the present disclosure provide triggering information transmission based on distance.

In one embodiment, a method for universal card acceptance is provided. The method includes creating a card network account for each card network of a plurality of card networks. The method also includes associating with a digital card the created card network accounts and providing to at least one of the card network accounts an account balance of the digital card. Additionally, the method includes receiving, from a mobile device, a selection of the digital card to conduct a transaction at a location. The method also includes providing a suggested card network, determined from the plurality of card networks, to the mobile device, to conduct the transaction. The suggested card network is based in part on which card networks are accepted at the location. The method also includes updating the account balance of the digital card on completion of the transaction.

In another embodiment, an electronic device is provided. The electronic device includes at least one processor. The at least one processor is a communication interface configured to communicate with a mobile device and at least one processor coupled to the communication interface. The least one processor is configured to create a card network account associated with each card network of a plurality of card networks. The at least one processor is also to associate with a digital card the created card network accounts and provide to at least one of the card network accounts an account balance of the digital card. The at least one processor is also configured to receive, from the communication interface via a mobile device, a selection of the digital card to conduct a transaction at a location. The at least one processor is also configured to provide a suggested card network, determined from the plurality of card networks, to the mobile device, to conduct the transaction, the suggested card network based in part on which card networks are accepted at the location and update the account balance of the digital card on completion of the transaction.

In yet another embodiment a non-transitory computer readable medium comprising program code is provided. The program code, when executed by at least one processor of a mobile device, causes the at least one processor to create a card network account associated with each card network of a plurality of card networks, associate with a digital card the created card network accounts, provide to at least one of the card network accounts an account balance of the digital card, receive, from a mobile device, a selection of the digital card to conduct a transaction at a location, provide a suggested card network, determined from the plurality of card networks, to the mobile device, to conduct the transaction, the suggested card network based in part on which card networks are accepted at the location, and update the account balance of the digital card on completion of the transaction.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
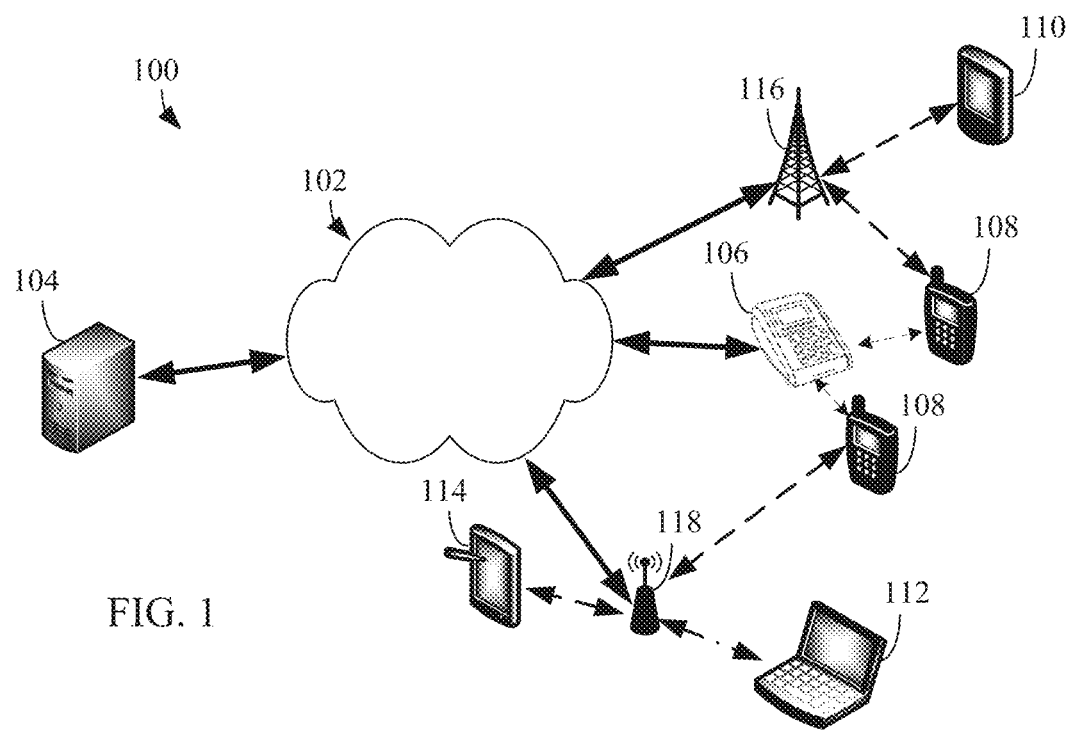
FIG. 1 illustrates an example communication system in accordance with an embodiment of this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 may represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a point of sale (POS) terminal 106, a mobile telephone or mobile devices 108 (i.e., smartphone), a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 108, 112, and 114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, the mobile devices 108 may transmit information securely and efficiently to another device, such as, for example, the POS terminal 106 (such as a payment device). The mobile devices 108 can track their location, geographically and/or with respect to the POS terminal 106, and trigger the information transmission between POS terminal 106 and mobile device 108. A mobile device 108 (or other client device 110-114) can provide a real-time user-friendly payment method through a universal open loop digital card. Details of the universal open loop digital card will be discussed in more details below. Transmissions, in the form of payments, may be in the form of communication between the two client devices (i.e., POS terminal 106 and mobile device 108). Some payment methods, for example near field communication (NFC), allow two-way communication between a POS terminal 106, and the mobile device 108 (or other client device 110-114). Other payment methods, for example magnetic stripe transmission (MST), only allow one-way communication from mobile device 108 to POS terminal 106.

The process and system provided in this disclosure allow payments on a certain card network when more than one card network is supported in a device or application. Card network represents a payment provider such as VISA™, MASTERCARD™, AMERICAN EXPRESS™, DISCOVER™, etc. The process and system provided in this disclosure can select a correct payment method in real time, without user input, for applications (or devices) supporting more than one card network(s), when performing payments on a POS terminal 106, regardless of the card network(s) accepted at the POS terminal 106. Additionally, the process and system provided in this disclosure also allow for a contactless payment method through a device (i.e., POS terminal) or application regardless of whether the contactless payment methods, provided by the POS terminal 106, are one-way or two-way communication.

Using the above process, a digital open loop cash card having access to one or more card networks can intelligently decide which card network to utilized in carrying out a transaction between POS terminal 106 and for example mobile device 108. The system allows a digital open loop cash card to be used at any POS terminal 106 regardless of the card network associated with the POS terminal 106 as the system decides and switches the card network to an accepted card network at the POS terminal 106. The system may allow a user to activate the payment digital cash card on supported client devices (i.e., mobile device 108) with supported application on a payment device (i.e., POS terminal 106) without offering payment method information such as the appropriate card network. The system can process the payment method selection of the card network fast enough to make sure payment procedure can be finished within industry-standard required time. The system also has the ability to stop an unwanted payment method on a card network timely to ensure there is no influence on the ongoing payment.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
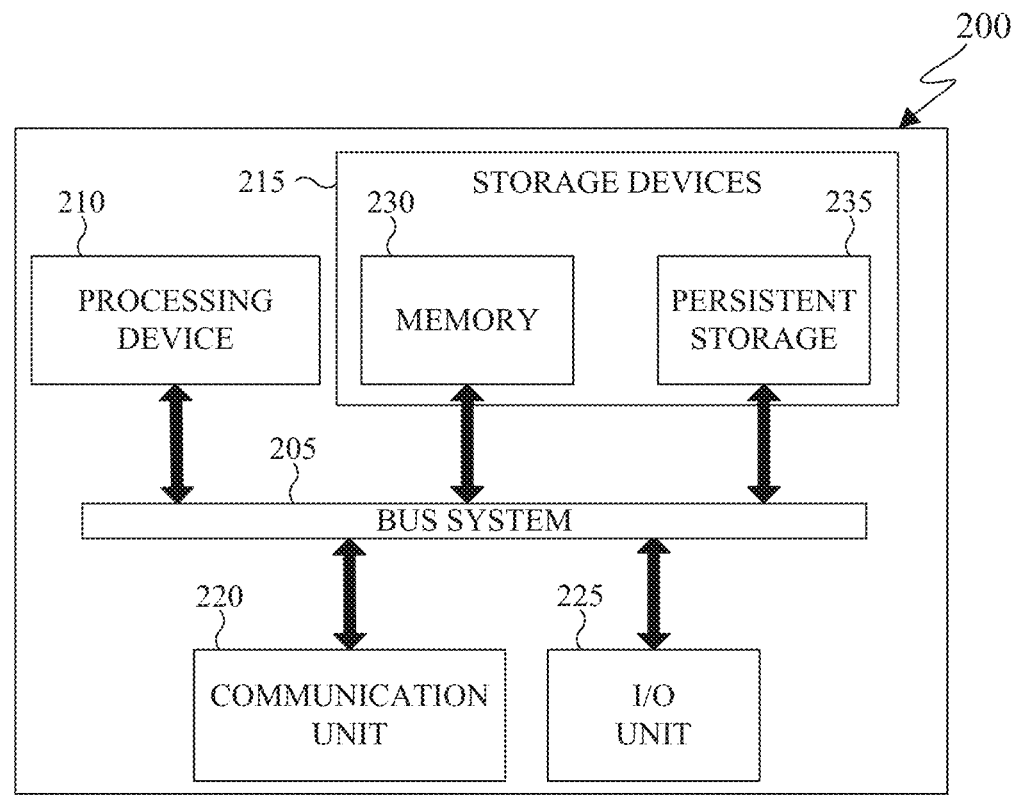
FIG. 2 illustrates an example electronic device in accordance with an embodiment of this disclosure.
Figure 3:
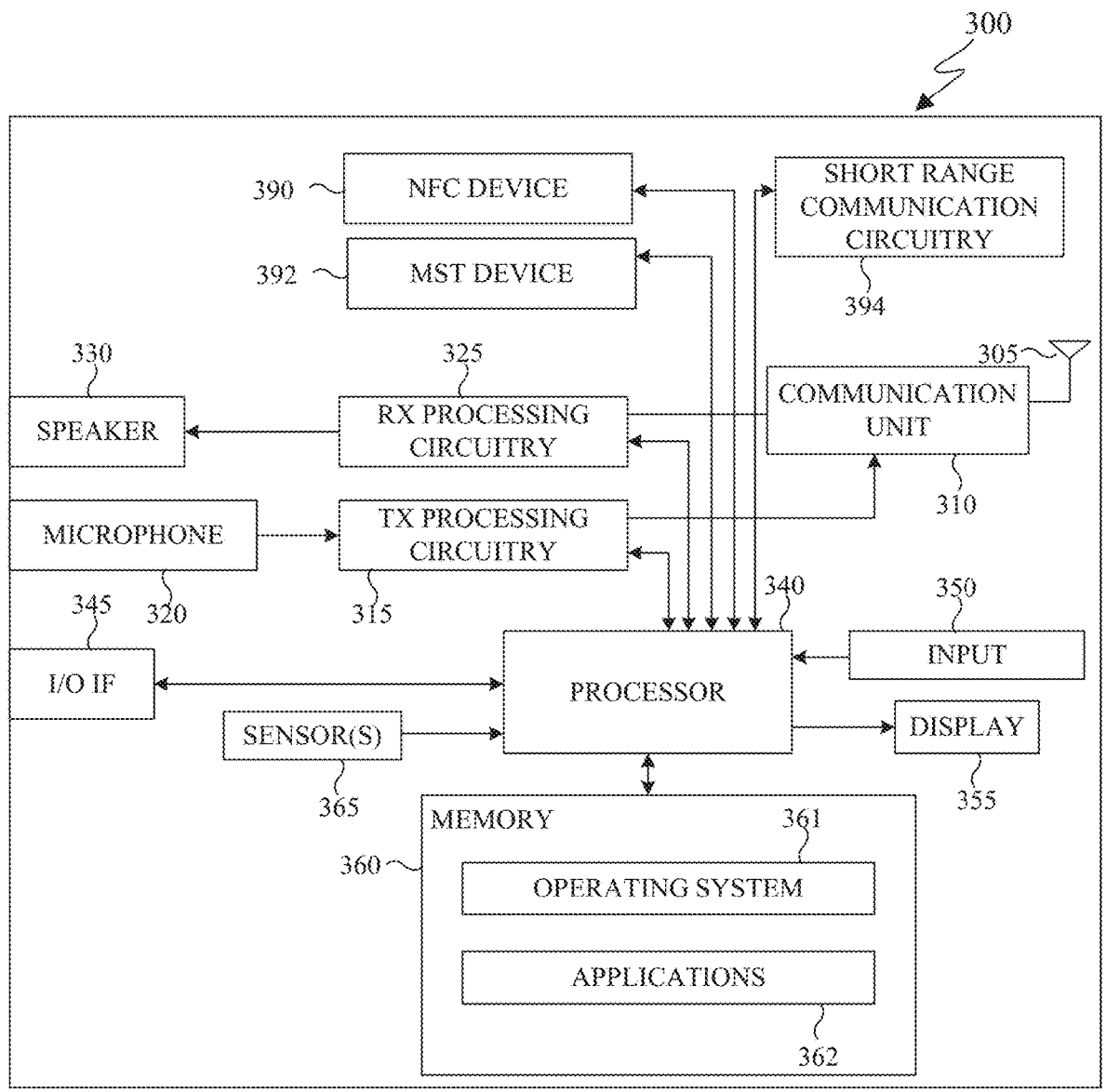
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

As shown in FIG. 2, the server 200 includes a bus system 205, which supports communication between at least one processing device(s) 210, at least one storage device(s) 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As described in more detail below server 200 may represent one or more card network servers, one or more payment network servers, and/or one or more digital card servers for implementing a mobile payment service, of the digital card, on mobile device 108 through POS terminal 106. For example, the one or more card network servers may represent servers of a card company (and/or a financial institution) which provide payment products and/or a network to process transactions over (i.e., a trusted service manager (TSM) server). The payment network servers may include one or more servers of an issuing bank, such as a server which manages the financial account balance of the digital card and/or a server which manages a token associated with a payment application (i.e., a token service provider (TSP) server). The digital card server for example, may include, for example, a server which manages the digital card (wallet management server).

According to an embodiment, the digital card server may provide payment information (e.g., a one-time token (OTT)) to the POS terminal 106 whenever a payment transaction is conducted by interacting with the card network server of the card company (and/or the financial institution). The digital card may have accounts with one or more card network servers which it can automatically switch between depending which card network server POS terminal 106 accesses. After performing specified secure authentication, the mobile device 108 may transmit the received payment information to the POS terminal 106 over various channels (e.g., a MST channel, a NFC channel, and the like). Mobile device 108 and POS terminal 106 may complete the payment transaction by transmitting the payment information to the card network server of the card company which will obtain payment approval through the payment network servers and/or the digital card server.

According to an embodiment, a secure authentication policy applied to the digital card may be determined by the card company via the card network server, the financial institution (an example of a card issuer) via the payment network server of, the digital card server and/or the mobile device 108. Information (or data) including the secure authentication policy of the various payment cards may be transmitted to the POS terminal 106 by the mobile device 108.

FIG. 3 illustrates an electronic device 300. The electronic device 300 is an example of one or more of the client devices 106-114 in FIG. 1, in which one or more embodiments of the present disclosure may be implemented. The embodiment of the electronic device 300 illustrated in FIG. 3 is for illustration only, the electronic device 300 may come in a wide variety of configurations, and FIG. 3 does not limit the scope of this disclosure to any particular implementation of a electronic device. The embodiment of the electronic device 300 illustrated in FIG. 3 is for illustration only, and the client devices 106-114 of FIG. 1 could have the same or similar configuration. In various embodiments, the electronic device 300 may take different forms, and the present disclosure is not limited to any particular form. For example, the electronic device 300 may be a mobile communication device, such as, for example, a mobile station, head mountable display, a subscriber station, a wireless terminal, a smart phone, mobile device (similar to mobile device 108 of FIG. 1) a tablet (similar to tablet computer 114 of FIG. 1), a payment terminal (similar to POS terminal 106 of FIG. 1), etc., that is useable with data transfer applications, such as payment applications.

As shown in FIG. 3, the electronic device 300 includes an antenna 305, communication unit 310, transmit (TX) processing circuitry 315, a microphone 320, and receive (RX) processing circuitry 325. The communication unit 310 may include, for example, a RF transceiver, a Bluetooth transceiver, or a WiFi transceiver. The electronic device 300 also includes a speaker 330, a processor 340, an input/output (I/O) interface (IF) 345, a input 350, a display 355, a memory 360, sensor(s) 365, a NFC device 390, magnetic stripe transmission (MST) device 392, and other short range communication circuitry 394. The memory 360 includes an operating system (OS) 361 and one or more applications 362. NFC device 390 and MST device 392 may be examples of short range communication circuitry 394. Short range communication circuitry 394 can include additional communication interfaces, such as Bluetooth, ZIGBEE, infrared, etc. In different embodiments, each of the elements 390-394 can be a part of the same circuitry, separate pieces of circuitry, or included as part of the processing circuitry 325 and 315.

The communication unit 310 receives, from the antenna 305, an incoming RF signal transmitted by an access point (e.g., base station, Wi-Fi router, Bluetooth device) for a network (e.g., a Wi-Fi, Bluetooth, cellular, 5G, LTE, LTE-A, WiMAX, or any other type of wireless network). The communication unit 310 may down-convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the electronic device 300 with the ability to connect to other devices, such as laptop computers and handheld computers. The I/O interface 345 is the communication path between these accessories and the processor 340.

The processor 340 is also coupled to the input 350 and the display 355. The operator of the electronic device 300 can use the input 350 to enter data and/or inputs into the electronic device 300. Input 350 may be a keyboard, touch screen, mouse, or other device capable of acting as a user interface to allow a user in interact with electronic device 300. For example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. The input 350 can also include a control circuit. In the capacitive scheme, the input 350 can recognize touch or proximity. The display 355 may be a liquid crystal display, light-emitting diode (LED) display, optical LED (OLED), active matrix OLED (AMOLED), or other display capable of rendering text and/or graphics, such as from websites, videos, games, etc.

The memory 360 is coupled to the processor 340. Part of the memory 360 could include a random access memory (RAM), and another part of the memory 360 could include a Flash memory or other read-only memory (ROM).

Electronic device 300 further includes one or more sensors 365 that can meter a physical quantity or detect an activation state of the electronic device 300 and convert metered or detected information into an electrical signal. For example, sensor(s) 365 may include one or more buttons for touch input, e.g., on the headset or the electronic device 300, a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 365 can further include a control circuit for controlling at least one of the sensors included therein. The sensor(s) 365 can be used to determine an orientation and facing direction, as well as geographic location of the electronic device 300. Any of these sensor(s) 365 may be located within the electronic device 300, within a headset configured to hold the electronic device 300, or in both the headset and electronic device 300, for example, in embodiments where the electronic device 300 includes a headset.

The NFC device 390 can wirelessly transmit and receive data with other NFC devices. In one example, the NFC device 390 can be used to transmit and receive data for payment transactions. The NFC device 390 can emit and/or receive a predetermined Radio Frequency (RF) within a predetermined region. The NFC service may include, for example, a terminal mode, a card mode (or NFC card mode), and a Peer-To-Peer (P2P) mode. The terminal mode executes a function of reading a tag and inputting information to the tag; the card mode executes a transportation card or credit card function; and the P2P mode executes a function of sharing data. For example, the data may include business card or multimedia data.

The MST device 392 includes a driver and an inductor, and the MST device 392 is configured to receive the stream of pulses from the processor 340, to amplify and shape the received stream of pulses, and to generate and emit high energy magnetic pulses including data. The data can include magnetic stripe data of a payment card. The inductor is driven by a series of timed current pulses that result in a series of high energy magnetic pulses that resemble the fluctuating magnetic field created by a moving magnetic stripe. Electronic device 300 may transmit the magnetic field signal to a POS device (i.e., POS terminal 106 of FIG. 1). The POS device may restore the data by detecting the magnetic field signal using a magnetic stripe reader or magnetic secure reader (MSR) and converting the detected magnetic field signal into an electric signal. In one example embodiment, a payment application is programmed to be associated with a pre-selected payment card and activating of the payment application initiates the emission of high energy magnetic pulses including the magnetic stripe data of the pre-selected payment card. The term "MST" in the specification may be used as a meaning of calling the magnetic secure transmission or the magnetic stripe transmission As described in more detail below, the electronic device 300 may include circuitry for and applications for MST and NFC communications. Although FIG. 3 illustrates one example of electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). As another example, the NFC device 390 and/or MST device 392 can be combined into a single device, combined with the circuitry 315 and 325, or combined with the communication unit 310. Also, while FIG. 3 illustrates the electronic device 300 configured as a mobile telephone, tablet, or smartphone, the electronic device 300 could be configured to operate as other types of mobile or stationary devices.

As described in more detail below, the electronic device 300 can be one example of any of client devices 108-114 for the use of selecting a method for transferring data. The electronic device 300 can be used to remotely access information, on a server, such as server 104 of FIG. 1 or server 200 of FIG. 2, about the communication methods of another device. Additionally, the electronic device 300 can be used to select a payment method for a payment process with another device.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, client devices could be configured to operate as other types of mobile or stationary devices, such as a payment device. In addition, as with computing and communication networks, electronic devices and servers can come in a wide variety of configurations, and FIGS. 2 and 3 do not limit this disclosure to any particular electronic device or server.

Figure 4:
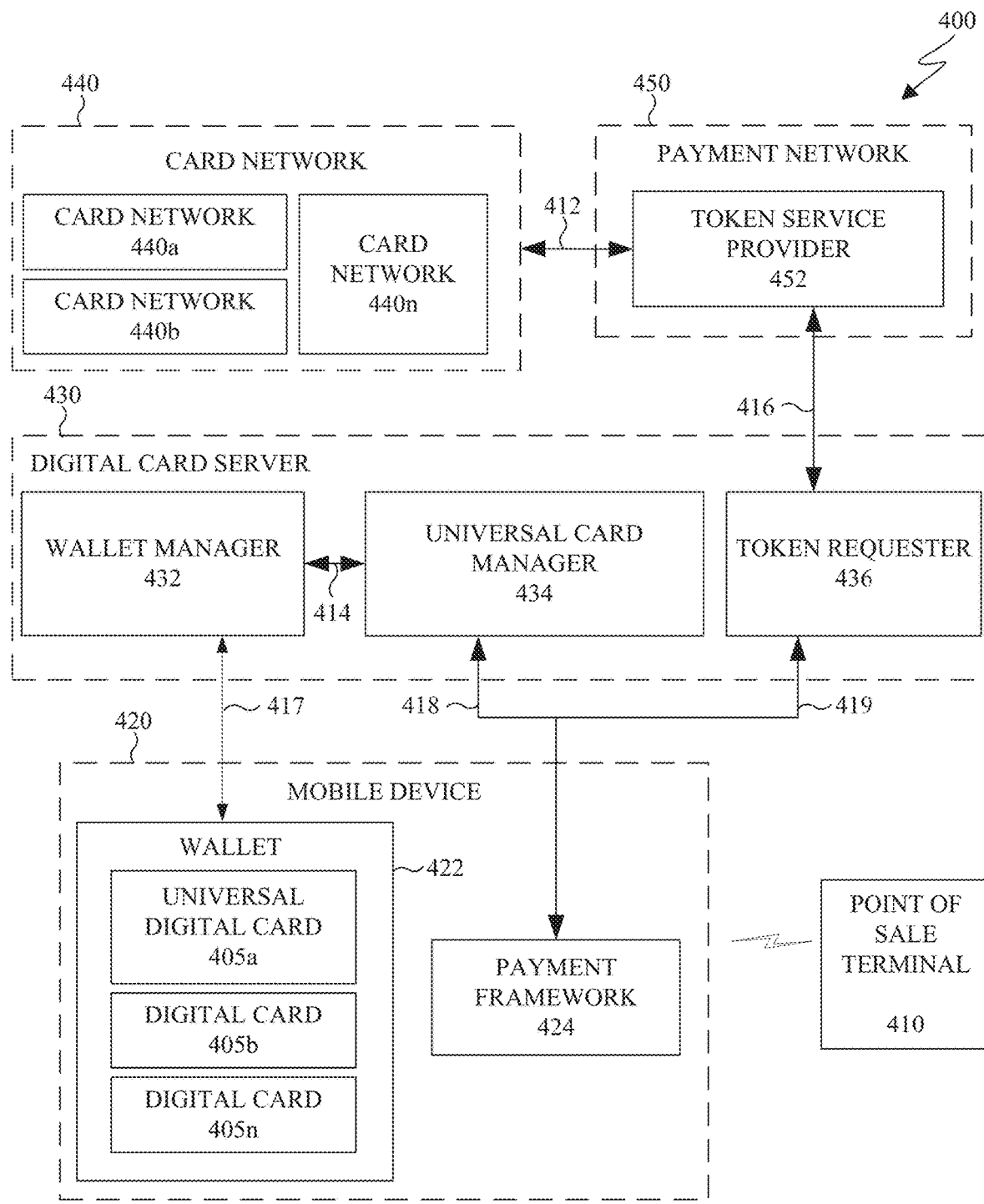
FIG. 4 illustrates an example block diagram in accordance with an embodiment of this disclosure.

Reference is now made to FIG. 4. FIG. 4 illustrates an example block diagram in accordance with an embodiment of this disclosure. Environment 400 illustrates a high level architecture of the digital card. The block diagram embodiment and information transmission associated therewith is for illustration only, and does not limit the scope of this disclosure to any particular implementation. Many modifications to the depicted environment 400 may be made by those skilled in the art without departing from the scope of the disclosure. Other embodiments of the environment 400 could be used without departing from the scope of the present disclosure. In this exemplary embodiment, environment 400 includes mobile device 420 (similar to mobile device 108 of FIG. 1 and/or electronic device 300 of FIG. 3), digital card server 430 (similar to server 104 of FIG. 1 and/or server 200 of FIG. 2), card network 440 (similar to server 104 of FIG. 1 and/or server 200 of FIG. 2), and payment network 450 (similar to server 104 of FIG. 1 and/or server 200 of FIG. 2), all interconnected over network 102.

Mobile device 420 may include internal and external components as previously depicted and described in further detail with respect to FIG. 3. Further, in this illustrative example, the mobile device 420 may represent the mobile device 108 in FIG. 1. However, in alternative embodiments, mobile device 420 may represent any client device 108-114 in FIG. 1. Digital card server 430, card network 440, and payment network 450, may include internal and external hardware components, as previously depicted and described in further detail with respect to FIG. 2. Further, in this illustrative example, card network 440 may represent one or more servers and/or card network 440 may represent multiple card networks. Similarly, in this illustrative example, payment network 450 may represent one or more servers and/or payment network 450 may represent multiple payment networks.

Embodiments of the present disclosure recognize and take into consideration that mobile device 420 may provide a variety of functions, similar to that of a smart phone. Mobile device 420 may communicate with digital card server 430. Mobile device 420 may communicate with a POS terminal 410 over a MST channel, NFC channel, and/or through other communication mediums. For example, if a user, of mobile device 420 activates a MST module internally or externally coupled to the mobile device 420, the mobile device 420 may generate and emit a magnetic field modulated in a specified scheme, including payment data using the activated MST module. Thereafter, if the mobile device 420 comes is within a specified distance to the MST reader included in the POS terminal 410, payment data may be transmitted to the POS terminal 410 through the emitted magnetic field. Further, according to another example, if the user activates a NFC module internally or externally coupled to the mobile device 420, the mobile device 420 may generate and emit an electric field (or an electromagnetic field) of a specified frequency including payment data using the activated NFC module. Thereafter, if the mobile device 420 is within a specified distance to a NFC reader included in POS terminal 410, the payment data may be transmitted to the POS terminal 410 through the emitted electric field (or the emitted electromagnetic field).

Embodiments of the present disclosure provide a dynamic method and system for providing a universally accepted, open loop, digital card at any POS terminal 410 and/or internet vendor. The digital card is digital in nature and may have no physical counterpart. The digital card may reside on mobile device within wallet 422 on mobile device 420. The digital card is universal in nature as it may be accepted at any POS terminal in store purchases as well as purchases through on online vendor. The universal nature of the digital card permits the digital card to be utilized on any card network regardless of the card network used a POS terminal and/or vendor to make a purchase. The card network (i.e., card network 440) may be any financial institution which provides electronic transactions through for example a credit card or debit card network. In an embodiment, the digital card may have accounts with a variety of card networks, and can dynamically switch between accounts in order to process a payment.

As illustrated in environment 400, mobile device 420 includes wallet 422 and payment framework 424. Wallet 422 stores one or more digital cards (405*a*, 405*b*, through 405*n*) a user may use to process a transaction. Wallet 422 contains may contain any number of cards. As depicted in environment 400, wallet 422 includes universal digital card 405*a*, digital card 405*b*, through digital card 405*n*. In an embodiment, digital card 405*n* may represent any number digital cards. The cards contained within wallet 422 may contain physical counterparts. According to an embodiment, the universal digital card has no physical counterpart, and resides only within wallet 422.

In general, wallet 422 may contain digital cards that are open loop and/or close loop. Open loop cards may be used at any vendor who accepts the card network the card is provisioned over. An open loop card is not limited to a particular vendor however it is limited by a particular card network. In contrast, closed loop cards are limited to a single vendor (i.e., the issuing merchant). An example of a closed loop card is a gift card, limited to only one vendor. Wallet 422 may have a user interface allowing a user to select which digital card to use for a particular transaction. In contrast to an open loop card, according to an embodiment the universal digital card 405*a* may be used over any card network. In one embodiment, wallet 422, may allow user to manually select a card network in which to use the universal digital card 405*a* when making a transaction. In one embodiment, wallet manager 432 may also manage the transactions for a user and allow user to view past transactions.

In an electronic payment system, digital cards within wallet 422 are tokenized. The token is a digital identifier which replaces sensitive account information. For example, an account number associated with a physical card is replaced with a token when the card is digitized and incorporated into wallet 422. In one embodiment, the universal digital card 405*a* within wallet 422 may have one or more tokens each of which is associated with a specific card network. Therefore, dependent on which token payment framework 424 may transmit to the POS terminal 410, will determine which card network is utilized to authorize the payment.

Payment framework 424 may represent the internal components and programming software to convey a user selected digital card from wallet 422 to the POS terminal 410. In one embodiment, payment framework 424 and universal card manager 434 (discussed in greater detail below) may work together in determining the card network to utilize for a transition. In one embodiment, payment framework 424 may transmit a token representing the selected digital card to the POS terminal 410. Payment framework 424 may also initialize and transmit the token representing the digital card via NFC channel, MST channels or the like. In an embodiment, payment framework may communicate with the digital all card server to request a token representing each of the digital cards within the wallet 422.

In one embodiment, payment framework 424 may manage the universal digital card 405*a* within wallet 422. For example, payment framework 424 may determine which token to provide to the POS terminal 410. Based on the token provided by payment framework 424, the digital card may be routed to different card networks. In one embodiment, payment framework 424 can select a correct payment methods in real time, without user input, for applications (or devices) supporting more than one card network(s), when performing payments on a POS terminal 410 and/or online vendor, regardless of the card network(s) accepted location. For example, payment framework 424 may intelligently decide which card network to utilize in carrying out a transaction between the mobile device 420 and a POS terminal 410 and/or online vendor (not shown in FIG. 4). In one embodiment, payment framework 424 may decide and switch the card network to an accepted card network at the POS terminal 410 independently, or based on received information.

In one embodiment, payment framework 424 may select an appropriate card network fast enough to make sure payment procedure can be finished within industry standard required time. In one embodiment, payment framework 424 also has the ability to stop an unwanted payment method on a card network timely to ensure there is no influence on the ongoing payment. For example, payment framework 424 can stop a transaction upon determining the card network is not supported at the POS terminal 410 and/or online vendor.

Digital card server 430 represents a server for the digital card. Digital card server 430 includes wallet manager 432, universal card manager 434 and token requester 436. Additional conditions not shown in FIG. 4 could be added dependent according to particular needs as appreciated by those skilled in the art.

Wallet manager 432 coordinates wallet 422. For example, arrow 417 depicts wallet 422 and wallet manager 432 in two way communications. In one embodiment, arrow 417 illustrates wallet 422 along with wallet manager 432 registering card. The card may be a universal digital card (similar to universal digital card 405*a*), a digital card, a close loop card, an open loop card, or any combination thereof. Wallet manager 432 may manage all cards within wallet 422.

Universal card manager 434 manages the universal digital card 405*a* within wallet 422. In one embodiment, universal card manager 434 may communicate with wallet manager 432. For example, arrow 414 depicts universal card manager 434 communicating with wallet manager 432. Universal card manager 434 may provide wallet manager 432 with information regarding universal digital card 405*a*. Information may include account balances, card networks universal digital card may be used on, transaction history, and the like.

Embodiments of the present disclosure recognize and take into consideration that the universal digital card 405*a* may be associated with a reward system. For example, upon a user performing a certain action, and satisfying one or more criteria, funds may be added to the universal digital card, described in further details below. Universal card manager 434 may manage the reward promotions going to universal digital card 405*a*. Universal card manager 434 may generate criteria, which when satisfied a reward is issued, and deposited into universal digital card 405*a*. Universal card manager 434 may determine if a particular criterion has been satisfied. Universal card manager 434 may identify if a particular criterion and upon one or more conditions being satisfied, push a notification notify user (for example, through wallet manager 432). Universal card manager 434 may generate universal digital card 405a, the card, and deposit monetary funds into the card upon particular criterion has been satisfied and/or if wallet 422 does not contain a universal digital card 405a.

In one embodiment, universal card manager 434 may create an account for one or more card networks (i.e., card network 440a, card network 440b, through card network 440n). The universal card manager 434 may link each account with the universal digital card 405a. For example, each card network may have its own account linked to the universal digital card 405a. Therefore, when the universal digital card 405a executes a transaction over a POS terminal 410 which is only associated with card network 440b, universal card manager 434 may direct the universal digital card 405a to utilize account associated with card network 440b. For example, universal digital card 405a may transmit to POS terminal 410 a token associated the card network 440b, in order to perform the transaction. If universal digital card 405a transmits the account of a card network which is not accepted at the POS terminal 410, the transaction is denied. For another example, often POS terminals accept multiple card networks (i.e., card network 440a and card network 440b). Then universal digital card 405a may complete the transaction over an account associated with card network. However, if universal digital card 405a submits an account associated with card network 440c, (and card network 440c is not accepted at the POS terminal 410) then the transaction may be denied.

In one embodiment, universal card manager 434 may communicate payment framework 424. For example, arrow 418 depicts universal card manager 434 communicating with payment framework 424. Payment framework 424 may provide an indication to universal card manager 434 of a transaction at a POS terminal 410 using the universal digital card 405a. Universal card manager 434 may provide payment framework 424 with information regarding which token to use dependent on which card network is accepted at the POS terminal 410. In one embodiment, universal card manager 434 may, through a location detecting service (not shown), determine the location of mobile device 420 and derive location of the POS terminal 410. Thereby universal card manager 434 may identify one or more card network(s) accepted at the POS terminal 410. Universal card manager 434 may identify the card network(s) accepted at the POS terminal 410 through a database. Universal card manager 434 may identify the card network(s) accepted at the POS terminal 410 through identifying past card networks utilized at the location, by mobile device 420 and/or alternative mobile devices not shown. Universal card manager 434 may derive a pattern of previous selected card networks at the location, based on mobile device 420, and other mobile devices (not shown). Universal card manager 434 may indicate an accepted card network when based on the general geographic location of mobile device, by identifying the vendors within a specific radius and the card networks accepted by the vendors. In an example with multiple vendors in close proximity, the universal card manager 434 may suggest a common card network accepted by a majority of vendors For another example, universal card manager 434 may determine an appropriate card network based on previous transactions of other universal digital cards on other mobile devices. Universal card manager 434 may also allow a user to manually select a card network. The universal card manager 434 may also allow the user to determine a default card network for most usages of the universal digital card. Such default card network may be adjusted by the example indications provided above or other similar mechanisms.

In one embodiment, universal card manager 434 may oversee and manage the monetary funds within an account associated with universal digital card 405a. Universal card manager 434 may manage the location of electronic monetary funds on the user account associated with the universal digital card 405a. For example, universal card manager 434 may divide the monetary funds of the user account among the accounts created with each card networks (card network 440a, card network 440b, through card network 440n) universal card manager 434 may also include a maximum limit associated with each amount of money provided to each account. Therefore, when a transaction occurs over card network 440b, the transaction amount may not exceed the maximum limit, but can exceed to money allocated to card network 440b. If the transaction is above the money allocated to card network 440b, but below the maximum limit, universal card manager 434 may, after the transaction concludes, re-allocate the monetary funds across the card networks and provide the card networks a new maximum limit (based on the current account balance). For another example, universal card manager 434 may designate the users account balance as a maximum limit and provide the maximum limit to each account associated with a card network (card network 440a, card network 440b, through card network 440n). Therefore, a transaction may not exceed the maximum limit. After each transaction, universal card manager 434 may provide each card network a new maximum limit based on the current account balance.

In one embodiment, universal card manager 434 may allow monetary funds to be transferred between persons who have a personal universal digital card. For example, the universal card manager 434 provision a user interface in payment framework 424 to allow a user to send monetary funds from universal digital card 405a associated with a first user to a universal digital card 405d (not shown) associated with a second user.

Token requester 436 manages requests for tokens. In one embodiment, token requester 436 is located on digital card server 430. In one embodiment, token requester is located within mobile device 420 and associated with payment framework 424. Arrow 419 depicts token data (associated with a universal digital card 405a, through digital card 405n) being exchanged between payment framework 424 and token requester 436. Arrow 416 depicts token data (associated with a universal digital card 405a, through digital card 405n) being exchanged between token service provider (TSP) 452 via payment network 450. Token requester 436 may act as an intermediary between payment network 450 and mobile device 420. For example, token requester 436 may request a token, when a new digital card is added or created in wallet 422, to payment framework 424 from TSP 452. Token requester 436 may request a token for a new solely digital card, or a digital card associated with a physical representation of a card (i.e., a debit card or a credit card). The token is a security feature to protect the personal account numbers associated with the actual card.

Card network 440 represents one or more card networks, specifically card network 440a, card network 440b, through card network 440n. One or more card networks may be accepted at a POS terminal 410 and/or an online vendor. When a user executes a transaction, payment framework 424 may send a token representing a digital card (i.e., digital card 405b) to the POS terminal 410. The POS terminal 410 may then forward the token to the card network associated with the particular token. The token may work with one only one card network, therefore, payment framework 424 selects and sends a token that will work over the card network(s) associated with the POS terminal 410. Card network 440, then forwards the token to the proper payment network 450 to either authorize or reject the payment. In one embodiment, each POS terminal 410 may utilize one or more card network 440, for example, card network 440a and card network 440b. In one embodiment, when universal digital card 405a is used for a transaction, any card network may be used as the universal digital card 405a has accounts to each card network (i.e., card network 440a, through card network 440n). Therefore depending on which token is utilized, as determined by universal card manager 434 and/or payment framework 424, the card network which operates the POS terminal 410 may be utilized to route the transaction information to payment network 450.

Payment network 450 represents one or more banks associated with a card network 440. Additionally and/or alternatively, payment network 450 may also be associated with a digital card (405a, 405b, through 405n). In one embodiment, payment network 450 may manage the monetary finds associated with each digital card (405a, 405b, through 405n). For example, the user account containing the monetary funds of universal digital card 405a may be associated with the payment network 450. For another example, the universal digital card 405a may be maintained by an issuing bank associated with payment network 450. By maintaining the universal digital card 405a, payment network 450 manages the balance of the monetary funds associated with the account. If universal digital card 405a is a reward card, payment network 450 may communicate with a reward server (not shown), associated with universal digital card 405a, which may notify payment network 450 to increase the monetary funds associated with the universal digital card 405a upon a criteria being met.

In one embodiment, payment network 450 may receive a token from card network 440 along with transaction details. Payment network 450 the may provide authorization for the transaction. For example, payment network 450 matches the token to, for example, to the universal digital card 405a, and determines either to accept or decline the transaction, and sends the response back to the respective card network 440.

Payment network 450 includes a token service provider (TSP) 452. TSP 452 is an entity within the payments ecosystem. FIG. 4 depicts the TSP 452 associated with payment network 450. In one embodiment, TSP 452 may be independent of payment network 450. TSP 452 manages the token vault which links each individual token to the personal account numbers, associated with each digital card (405a through 405n). For example, TSP 452 may perform one or more tasks including by not limited to: issuing and managing the entire lifecycle of payment credentials, implementing tokenization to reduce payment card fraud, oversee transactions, integrating transactions with the existing authorization protocols by converting and/or validating cryptograms, etc.

Arrow 412 depicts the TSP 452 communicating with card network 440. TSP 452 may communicate with one or more card network(s) 440a through 440n. For example, when card network 440a receives a token and transaction request from POS terminal 410, it forwards the information to TSP 452. TSP 452, through the token vault, matches the token to the respective account with the digital card (i.e., universal digital card 405a). Thereafter, payment network may either authorize or deny the transaction.

Arrow 416 depicts TSP 452 communicating with token requester 436. For example, arrow 416 depicts token data (associated with a universal digital card 405a, through digital card 405n) being exchanged with TSP 452. Token requester 436 may request a token, when a new digital card is added or created in wallet 422, from TSP 452.

Figure 5:
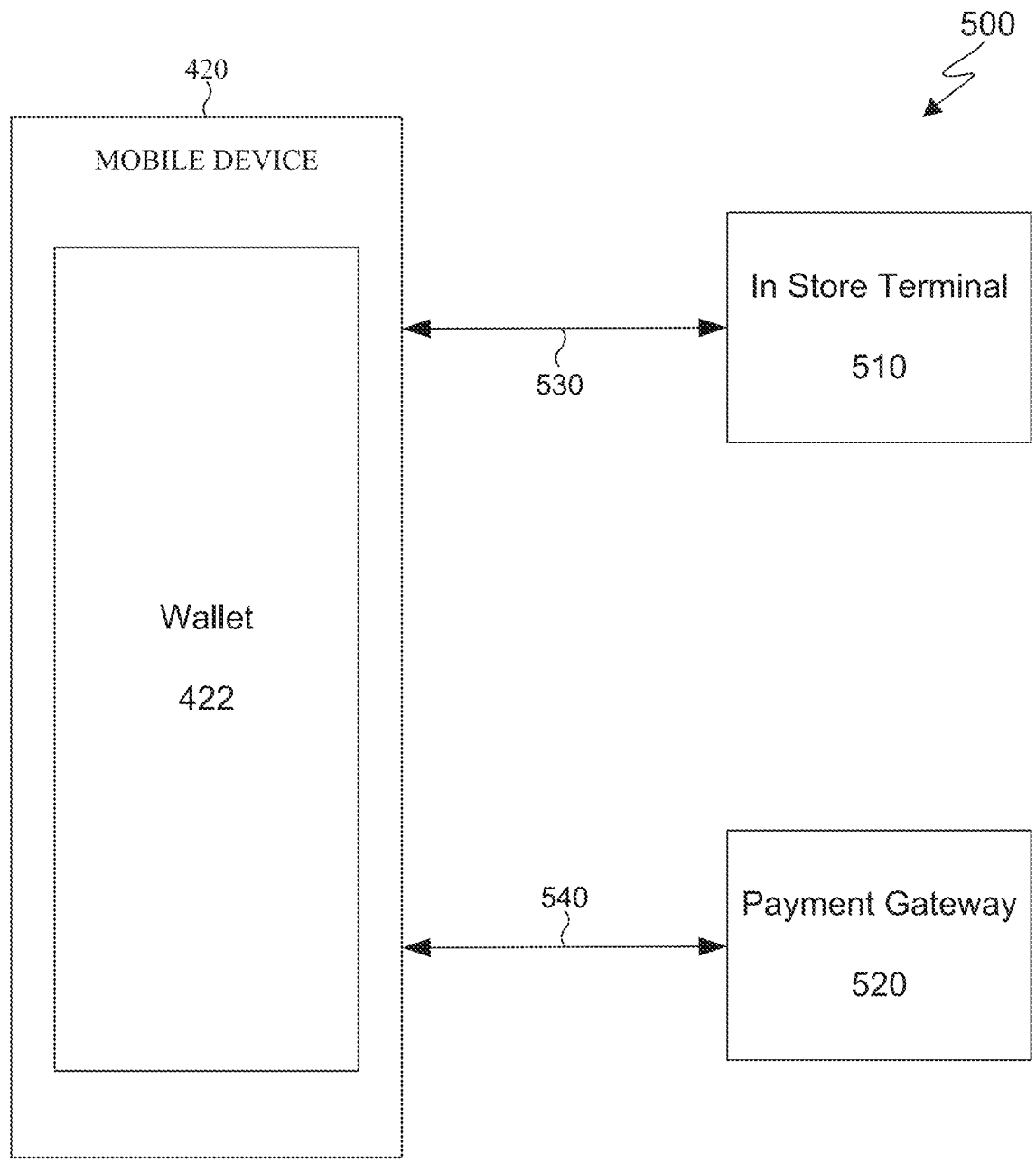
FIG. 5 illustrates an example block diagram in accordance with an embodiment of this disclosure.

Reference is now made to FIG. 5. FIG. 5 illustrates an example block diagram in accordance with an embodiment of this disclosure. Environment 500 illustrates an example implementation for use of universal digital card 405a (as described in FIG. 4) for both in store and on line purchases. The block diagram embodiment and information transmission associated therewith is for illustration only, and does not limit the scope of this disclosure to any particular implementation.

Mobile device 420 and wallet 422 of FIG. 5 represent the same elements of FIG. 4. Depending on the transaction type, in store (e.g., via POS terminal 410) or through an on-line vendor, the information transmitted may be different. In store terminal 510, may be similar to the POS terminal 410. For example, in store terminal 510, may be a POS terminal, similar to POS terminal 410 located in a retail, restaurant, convenient store, grocery store, etc. In store terminal 510 may be a physical POS terminal over which a payment transaction is provisioned. In store terminal 510 may support NFC and/or MST communication. In contrast, payment gateway 520 represents a payment gateway for online and/or payments performed within an application. Regardless of either transaction method (in store terminal 510 or payment gateway 520) universal digital card 405a, may be provisioned and used.

Arrow 530 illustrates a payment transaction through in store terminal 510 being executed with universal digital card 405a. Similarly, arrow 540 illustrates a payment transaction through payment gateway 520 being executed with universal digital card 405a. In one embodiment, a transaction between wallet 422 and in store terminal 510 may be conducted via NFC, along arrow 530. In one embodiment, a transaction between wallet 422 and in store terminal 510 may be conducted via MST, along arrow 530. In one embodiment, a transaction between wallet 422 and payment gateway 520 may be conducted via a cryptogram, along arrow 540.

Figure 6:
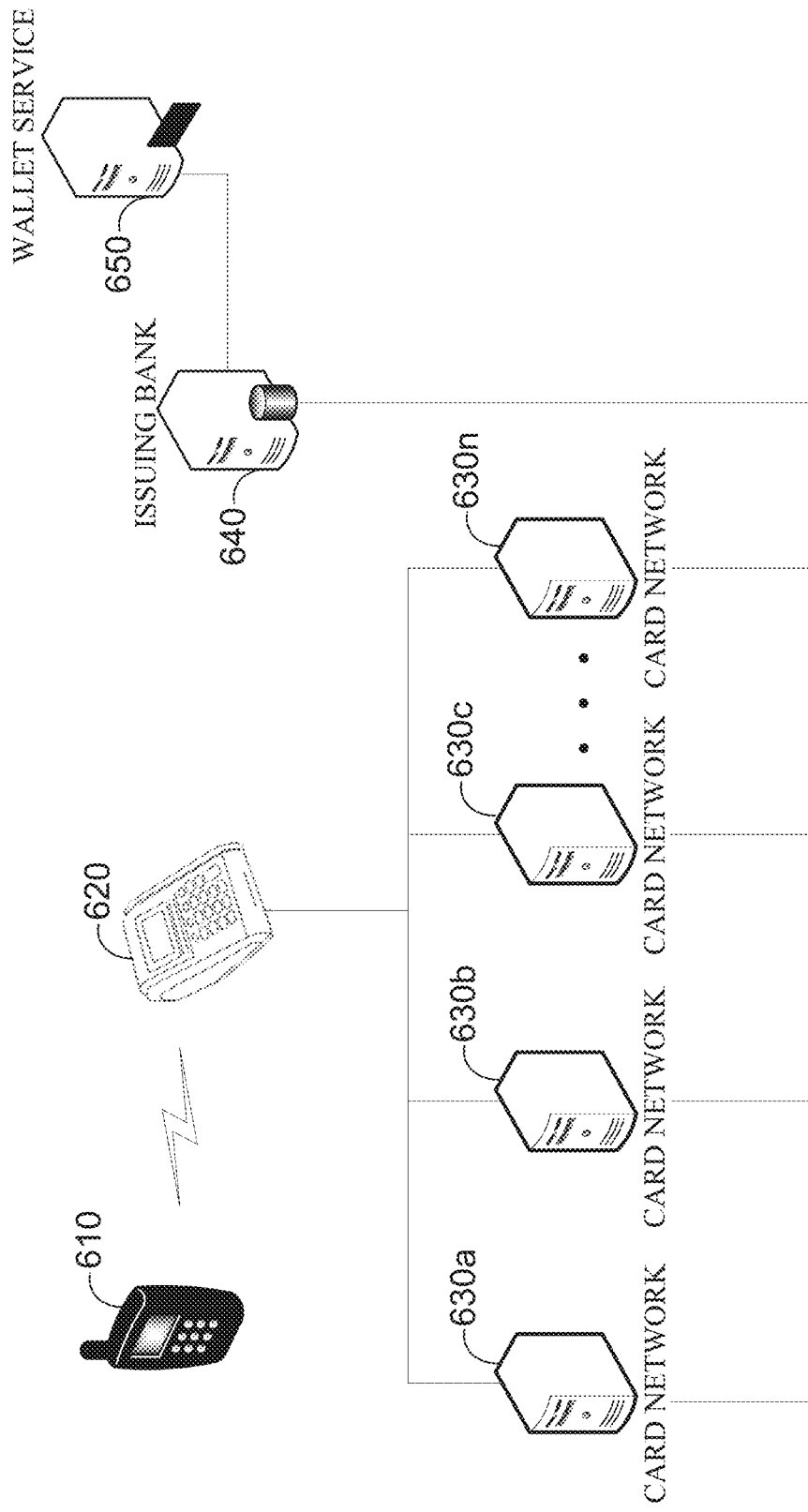
FIG. 6 illustrates an example of information transmission in accordance with an embodiment of this disclosure.
Figure 7:
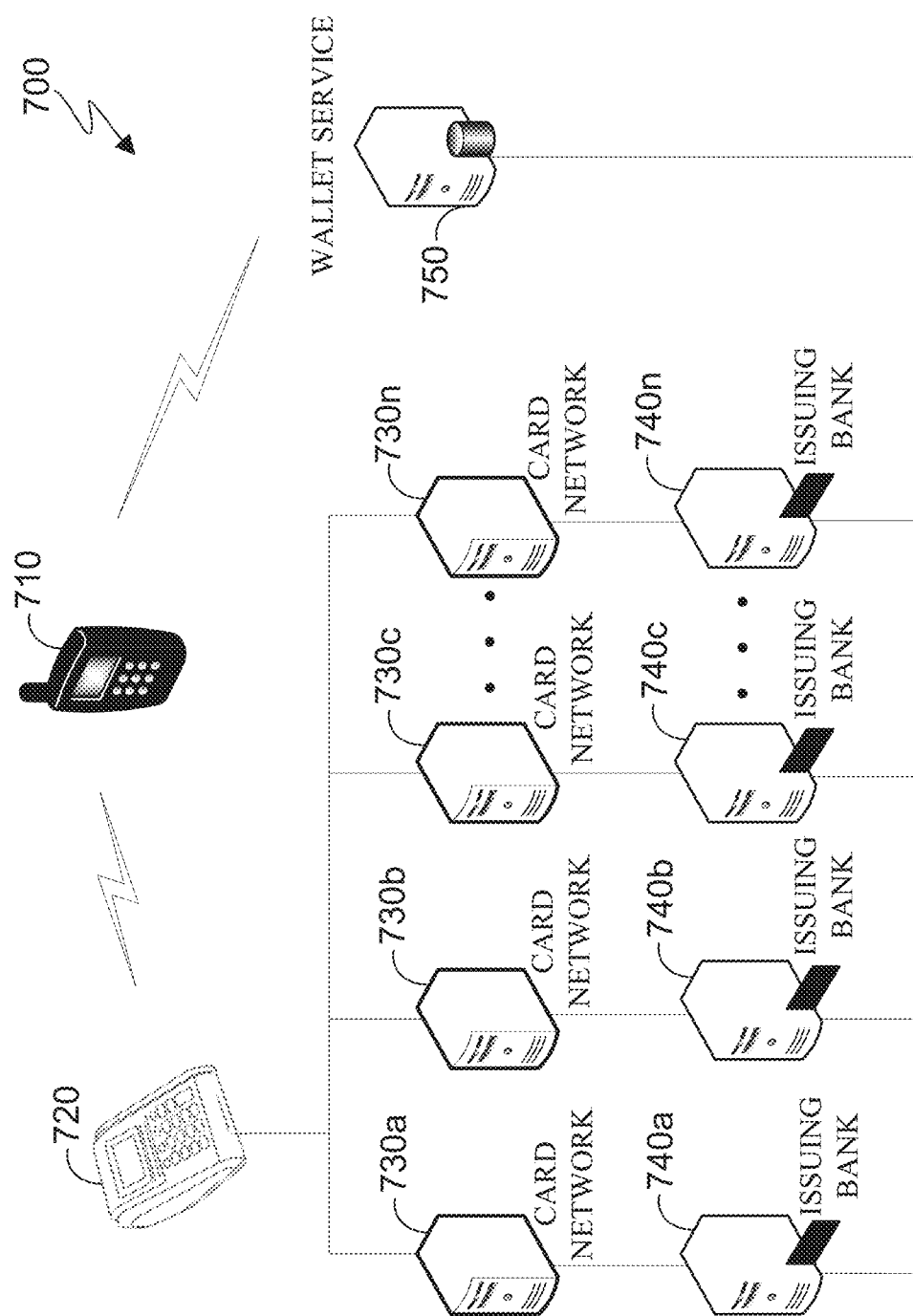
FIG. 7 illustrates an example of information transmission in accordance with an embodiment of this disclosure.

Reference is now made to FIGS. 6 and 7. FIGS. 6 and 7 illustrate a universal digital card can be used across multiple card networks, so the user of the universal digital card is not concerned of what card network a specific vendor accepts. The universal digital card is a single card with a single account balance with linked accounts to a plurality of card network. The universal digital card will have a set balance. In one embodiment, the universal digital card account balance may be stored in an issuing bank (see FIG. 6, issuing bank 640). In one embodiment, the universal digital card account balance may be equally distributed among the linked accounts for each network (see FIG. 7, issuing bank 740a through 740n).

FIG. 6 illustrates an example of information transmission in accordance with an embodiment of this disclosure. Environment 600 illustrates an example transmission using a universal digital card, similar to universal digital card 405a, of FIG. 4. In this illustrative example, mobile device 610 transmits payment information to POS terminal 620. The mobile device 610 may be similar to mobile device 420 of FIG. 4. The mobile device 610 may be similar to mobile device 108 of FIG. 1 or electronic device 300 of FIG. 3. The POS terminal 620 may be similar to POS terminal 410 of FIG. 4. The POS terminal 620 may be similar to POS terminal 106 of FIG. 1. The embodiment of information transmission is for illustration only, and does not limit the scope of this disclosure to any particular implementation of information transmission.

Embodiments of the present disclosure recognize that once a user initiates a transaction using the universal digital card 405a, the payment transmission may commence irrespective of which card network is associated with POS terminal 620. Embodiments of the present disclosure recognize and take into consideration that different POS terminals may utilize one or more card networks in order to transmit the payment transaction information to the issuing bank of the card (digital or physical). Therefore, if the card is not associated with the card network, the card network cannot transmit the payment transaction information to the issuing bank of the card, thereby preventing payment by denying the transaction. This can lead to a bad user experience, especially in cases where a user needs to select a different card and retry payment because of transmission errors. These exemplary scenarios may result in a user not making the purchase, dissatisfaction at the vendor/merchant and/or dissatisfaction with the mobile wallet and payment framework.

Accordingly, embodiments of this disclosure recognize and take into account that device (i.e., mobile device 610) or application on the device may through universal digital card 405a, choose a payment method in real time according to the card network(s) supported by payment terminal (i.e., POS terminal 620). It can be difficult to determine which payment method to use for payment on the terminal without user involvement as different POS terminals may support different methods and different card networks and the device (or application) is unaware of which methods are supported when a payment procedure starts. Embodiments of the present disclosure provide for transmission of information based on a universal digital card associated with multiple card networks. For example, the universal digital card may have an account with each card network. Based on the location a specific account may be used to direct the transaction through a particular card network. If the transaction is not supported, in real time, without user intervention, the universal digital card, through mobile device 610, may transmit another account to the POS terminal directed to a different card network. The transmission of information from the mobile device 610, may repeat until an account is selected which associated with a card network utilized on the POS terminal 620. Upon selecting an account with a card network which is supported by the POS terminal 620, the card network will transmit the transaction information to the issuing bank which can authorize or deny the transaction.

Referring to FIG. 6, mobile device 610 may transmit information associated with the universal digital card and an account associated with one or more card networks to POS terminal 620. In one embodiment, user of mobile device 610 selects the universal digital card 405a within wallet 422. In one embodiment, the universal digital card 405a user may select a specific card network for a specific transaction. In one embodiment, the universal digital card 405a may automatically select which card network to use for a specific transaction based on provisioning location information received from mobile device 610. For example, if the location information indicates the transaction is at a merchant's shop who only accepts a single card network, then the universal card manager may select that specific card network. For another example, if location information indicates that previous transactions (of user of mobile device 610 and/or other users) have utilized a single card networks, then the universal card manager may select that card network, previously used in order to conduct the transaction. For another example, if location information indicates that previous transactions (of user of mobile device 610 and/or other users) have utilized multiple card networks, then the universal card manager may select any specific card network, previously used within a time threshold.

Mobile device 610 transmits a token to for the selected card network to the POS terminal 620. This transmission may occur wirelessly through NFC, MST or a cryptogram, depending on what the POS terminal 620 accepts.

In one embodiment, the POS terminal 620 receives the transaction information along with information associated with the universal digital card including an account associated with one or more card networks (i.e., card network 630a through 630n). In one embodiment, the POS terminal 620 routes the token to the appropriate card network (i.e., the token associated with either 630a, 630b, 630c through 630n). As depicted in environment 600 POS terminal 620, may be associated with card networks 630a, 630b, 630c through 630n. In an alternative embodiment, POS terminal 620, may be associated with only card network for example, 630c. The token may only be routed to one card network. If the POS terminal 620 is not have an associated card network which can be used by the token, universal card manager 434 (of FIG. 4) may provide an indication to use a different token until the POS terminal 620 is able to route the token to an appropriate card network.

In one embodiment, if the token is directed to card network 630a, then card network 630a determines the corresponding account from the token information and checks with issuing bank 640 on whether to approve the transaction. In one embodiment, if the token is directed to card network 630b, then card network 630b determines the corresponding account from the token information and checks with issuing bank 640 on whether to approve the transaction. In one embodiment, if the token is directed to card network 630c, then card network 630c determines the corresponding account from the token information and checks with issuing bank 640 on whether to approve the transaction.

In environment 600, issuing bank 640, maintains the account information, including account balance of the universal digital card 405a. Issuing bank 640 may determine whether the account has a balance to cover the transaction. Issuing bank 640 then responds to the respective card network, as to whether to accept or deny the transaction.

In one embodiment, wallet service 650 may inform issuing bank 640 of whether funds are added to the account. In one embodiment, wallet service 650 may be based on a promotion server which provides cash incentives to the user of universal digital card 405a. In one embodiment, wallet service 650 may not be part of environment 600.

The following example is based on FIG. 6. If the account balance for the universal digital card is $100. Then the maximum limit is $100. Generally, the account balance and the maximum limit match. The account balance may be stored on the issuing bank 640. If a user wishes to spend $60 on card network 630c, the resulting account balance will be $40. Similarly, the new maximum limit will be reduced to $40.

FIG. 7 illustrates an example of information transmission, according to various embodiments of the present disclosure. Environment 700 illustrates an example transmission using a universal digital card, similar to universal digital card 405a, of FIG. 4. In this illustrative example, mobile device 710 transmits payment information to POS terminal 720. The mobile device 710 may be similar to mobile device 420 of FIG. 4. The mobile device 710 may be similar to mobile device 108 of FIG. 1. The POS terminal 720 may be similar to POS terminal 410 of FIG. 4. The POS terminal 720 may be similar to POS terminal 106 of FIG. 1. The embodiment of information transmission is for illustration only, and does not limit the scope of this disclosure to any particular implementation of information transmission.

FIG. 7 illustrates an example of information transmission in accordance with an embodiment of this disclosure. FIG. 7 is similar to FIG. 6, except that each issuing bank (740a, 740b, 740c through 740n) is exclusively associated with a card network (730a, 730b, 730c, through 730n), respectively. In one embodiment, (not shown) two or more issuing banks may be exclusively associated with a single card network. In one embodiment, (not shown) a card network may have its own issuing bank. As shown in FIG. 6, an issuing bank may be associated with multiple card networks.

Referring to FIG. 7, mobile device 710 includes a wallet with the universal digital card 405a that has tokens for each card network 730a, 730b, 730c, through 730n. In one embodiment, universal digital card 405a, on mobile device 610 may be associated with tokens for each issuing bank which are tied to the selection of the card network. In one embodiment, user of mobile device 710 selects the universal digital card 405a within wallet 422. In one embodiment, the universal digital card 405a user may select a specific card network for a specific transaction. In one embodiment, the universal digital card 405a may automatically select which card network to use for a specific transaction based on provisioning location information received from mobile device 710. For example, if the location information indicates the transaction is at a merchant's shop who only accepts a single card network, then the universal card manager may select that specific card network. For another example, if location information indicates that previous transactions (of user of mobile device 710 and/or other users) have utilized a single card networks, then the universal card manager may select that card network, previously used in order to conduct the transaction. For another example, if location information indicates that previous transactions (of user of mobile device 710 and/or other users) have utilized multiple card networks, then the universal card manager may select any specific card network, previously used within a time threshold.

Mobile device 710 transmits a token to for the selected card network to the POS terminal 720. This transmission may occur wirelessly through NFC, MST or a cryptogram, depending on what the POS terminal 720 accepts.

In one embodiment, the POS terminal 720 receives the transaction information along with information associated with the universal digital card including an account associated with one or more card networks (i.e., card network 730a through 730n). In one embodiment, the POS terminal 720 routes the token to the appropriate card network (i.e., the token associated with 730a, 730b, 730c, through 730n). As depicted in environment 700 POS terminal 720, may be associated with card networks 730a, 730b, 730c through 730n. In an alternative embodiment, POS terminal 720, may be associated with only card network for example, 730c. The token may only be routed to that one card network. If the POS terminal 720 is not have an associated card network which can be used by the token, universal card manager 434 (of FIG. 4) may provide an indication to use a different token until the POS terminal 720 is able to route the token to an appropriate card network.

The card network, may then determine the corresponding account from the token information and then check with the issuing bank on whether to approve the transaction. In one embodiment, if the token is directed to card network 730a, then card network 730a determines the corresponding account from the token information and checks with issuing bank 740a on whether the approve the transaction. In one embodiment, if the token is directed to card network 730b, then card network 730b determines the corresponding account from the token information and checks with issuing bank 740b on whether the approve the transaction. In one embodiment, if the token is directed to card network 730c, then card network 730c determines the corresponding account from the token information and checks with issuing bank 740c on whether to approve the transaction.

In environment 700, issuing bank 740a maintains the account information, including account balance of the universal digital card 405a. Issuing bank 740a may determine whether the account has a balance to cover the transaction. Issuing bank 740a then responds to the respective card network, as to whether to accept or deny the transaction. Issuing bank 740b-n may also perform the same functions, if user has an account with each respective issuing bank.

In one embodiment, wallet service 750 may inform issuing bank 740a-n of whether funds are added to an account. In one embodiment, wallet service 750 may be based on a promotion server which provides cash incentives to the user of universal digital card 405a. Wallet service 750 may track and maintain the information of the account balance and balance location on each issuing bank 740a-n. Wallet service 750 may distribute the balance to the respective accounts. Wallet service 750 may transfer balance based on the card network selected manually selected via a user interface and/or automatically the by the universal card manager 434. In one embodiment, wallet service 750 may not be part of environment 700.

The following example is based on FIG. 7. If the account balance for the universal digital card is $100. Then the maximum limit is $100. Generally, the account balance and the maximum limit match. The account balance may be divided among the card networks. For example, if there are four card networks linked to the universal digital card, then each card network will have an account balance of $25 and a maximum limit of $100. Therefore a user may spend any amount up to $100. Therefore, if user spends $60 on card network 730c at vendor, the transaction would result in a negative $35 balance on card network 730c. Thereafter the system will update the max limit on all for accounts to $40 dollars ($100 original balance less the $60 spent through card network 730c). The system will also adjust the balance for each of the four card networks, i.e., deduct $15 from each card network account (card network 730a, 730b, and 730d) and provide $45 to card network 730c. Thereby leaving $10 as the account balance in each of the four card networks, and a maximum balance of $40. In another example based on FIG. 7, the wallet service 750 may manage or track the balance location at any of the accounts of the issuing bank or within the wallet service 750. If the balance of the universal digital card is $100, the wallet service 750 may provide the balance to the account at the respective issuing bank of the card network selected for the transaction. Once the transaction is complete, the balance may be left in the account and the location noted by the wallet service 750. The next time the universal digital card is used and a different card network is selected, the balance may be transferred to the issuing bank associated with the different card network. In another example, the wallet service 750 may withdraw the remaining balance once the transaction is complete.

Figure 8A:
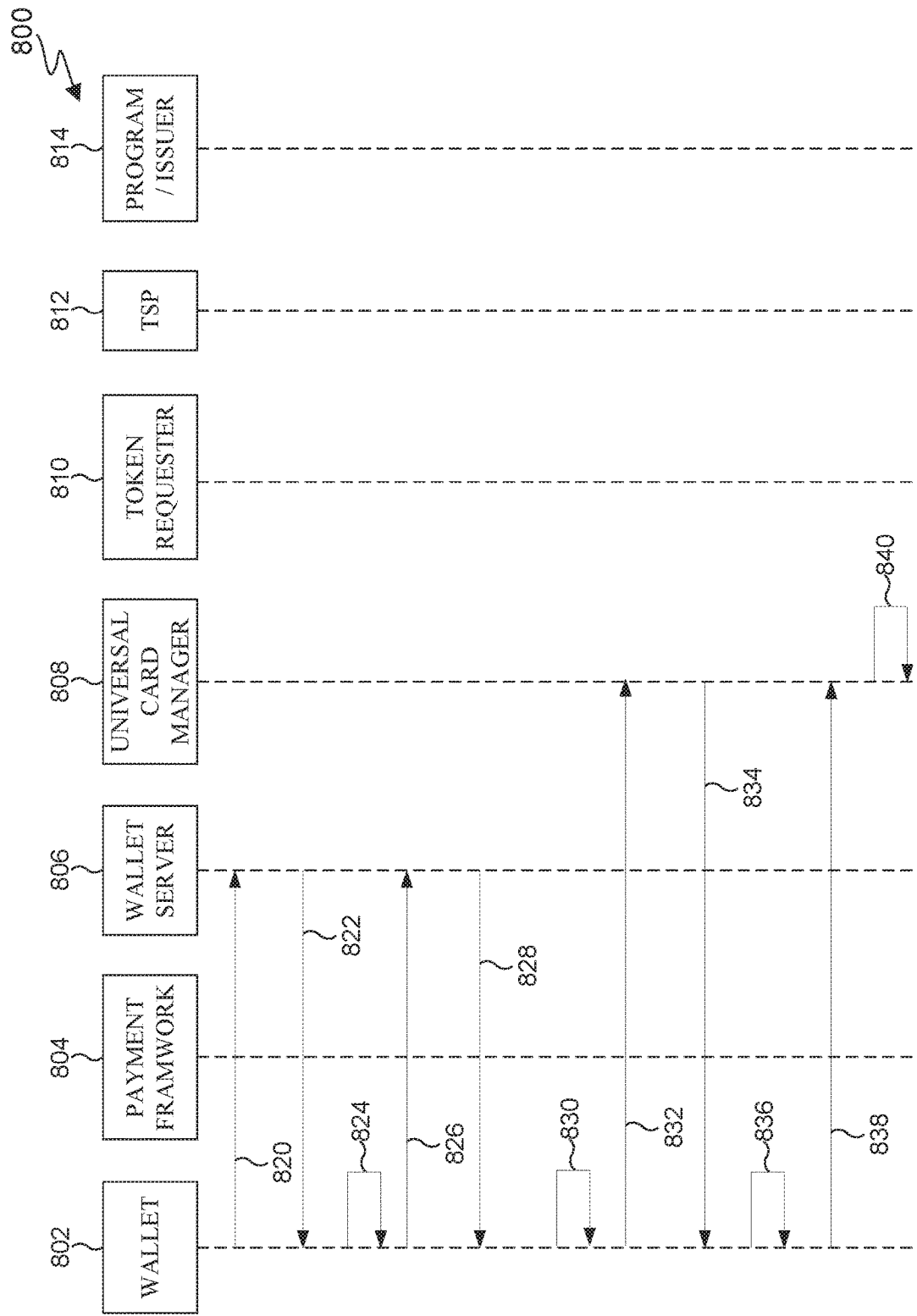
FIGS. 8A and 8B illustrate a command diagram for a card creation sequence in accordance with an embodiment of this disclosure.
Figure 8B:
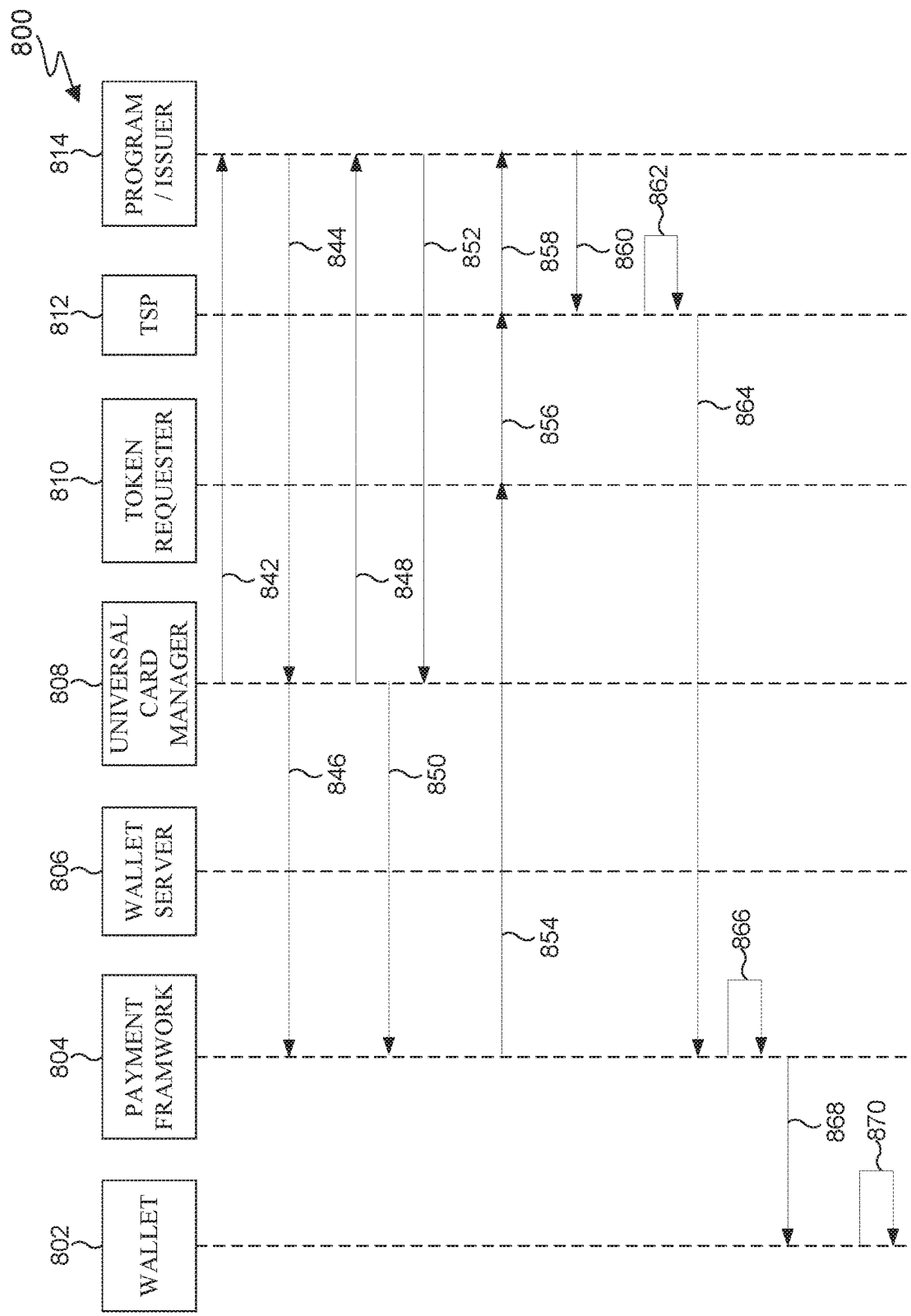

FIGS. 8A and 8B illustrates a command diagram for a card creation sequence in accordance with an embodiment of this disclosure. FIGS. 8A and 8B illustrate command diagram 800 depicting an open loop cash reward card digitalization flow, similar to the universal digital card 405a of FIG. 4. The steps in FIG. 8B continue the command diagram 800 in FIG. 8A. Command diagram 800 includes wallet 802, payment framework, 804, wallet server 806, universal card manager 808, token requester 810, TSP 812 and program/issuer 814. In one embodiment, wallet 802 may be similar to wallet 422 of FIG. 4. In one embodiment, payment framework 804 may be similar to payment framework 424 of FIG. 4. In one embodiment, wallet server 806 may be similar to wallet manager 432 of FIG. 4. In one embodiment, universal card manager 808 may be similar to universal card manager 434 of FIG. 4. In one embodiment, token requester 810 may be similar to token requester 436 of FIG. 4. In one embodiment, token service provider (TSP) 812 may be similar to TSP 452 of FIG. 4. This command diagram 800 is for illustration only and different portions may be rearranged, added, or removed in different embodiments. Additionally, processes within command diagram 800 may occur at separate times, in parallel, simultaneously.

The command diagram 800 begins at 820 by showing the sequence for registering an account with the wallet server 806. At 822, wallet 802 receives account verification from wallet server 806, confirming the registration of a new user account. At 824, the wallet 802 may receive input from a user accepting the terms and conditions associated with wallet 802. At 826, wallet 802 notifies wallet server 806 that the user accepted the terms and conditions. At 828, the wallet server 806 acknowledges the user's acceptance of the terms and conditions. At 830, the wallet 802 may receive an input from a user indicating a request to initialize the universal digital card. At 832, the wallet 802 may be directed towards the universal card manager 808, responsive to 830. In one embodiment 830 indicates a user input to create the universal digital card. In one embodiment 830 indicates a user's input to add an additional card network to the universal digital card. At 834, the universal card manager 808 may optionally provide the wallet 802 with additional terms and conditions for a universal digital card. At 836, the wallet 802 may receive input from a user accepting the additional terms and conditions for the universal digital card. At 838, the wallet 802 may provide the universal card manager 808 with a user's acceptance of the terms and conditions. As indicated, 834, 836 and 838 may be optional and the additional terms and conditions may be part of the terms and conditions associated with the wallet 802 as described above. Additionally, 830, and 832, may be part of the initial sequence for registering an account with the wallet server 806, as described above.

At 840, the universal card manager 808 performs a fraudulent activity check on the newly created universal digital card account. Thereafter, at 842, the create card account command is forwarded to a program/issuer 814. In one embodiment, program/issuer 814 oversees and manages the account associated with the universal digital card. In one embodiment, program/issuer 814 manages issuing the universal digital card. Program/issuer 814 generates preliminary account information for the universal digital card. At 844, program/issuer 814 sends personal account number and the expiration date of the universal digital card to universal card manager 808, in an encrypted manner. At 846, universal card manager 808 forwards the personal account number and the expiration date of the universal digital card to the payment framework 804. In one embodiment, at 844 and 846, the transmission of the personal account number and the expiration date of the universal digital card may remove the card verification value (CVV) to provide further encryption.

Process 848, 850 and 852 may occur parallel with process 854, 856, and 858. For example, processes 848, 850 and 852 address personal identification number (PIN) setup, while processes 854, 856, and 858 address provisioning the universal digital card. At 848, a get PIN command is set from universal card manager 808 to program/issuer 814. In one embodiment, the PIN may default to the last four numbers of the personal account number associated with the universal digital card. In one embodiment, the PIN may be randomly generated by program/issuer 814. In 850, universal card manager 808 may send a set PIN command to the payment framework 804. In 852, program/issuer 814 may send a PIN command to universal card manager 808. At 854, payment framework 804 sends a card provision command to token requester 810. At 856, token requester 810 requests a token from TSP 812, associated with the newly created universal digital card. The token requester 810 may request a token associated with one card network. The token requester 810 may request a token associated with multiple card networks. At 858, TSP 812 requests card details from program/issuer 814.

At 860, program/issuer 814 transmits to TSP 812 personal account number and various card data associated with the universal digital card. At 862, TSP 812 tokenizes the universal digital card. In one embodiment, tokenizing the universal digital card generates a token associated with the card. At 864, TSP 812 transmits the token associated with the universal digital card to the token requester 810, which may subsequently transmit the token to the payment framework 804. At 866, payment framework 804 stores the card data and token of the universal digital card. At 868, payment framework 804 transmits the card data to wallet 802. At 870, wallet 802 may display the card to user on a graphical user interface. Thereafter, the universal digital card is created and available on a mobile device to be used to make in store and online purchases anywhere the open loop card is accepted, i.e., dependent on which card networks are associated with the digital card.

In one embodiment, command diagram 800 illustrates the process of automatically tokenizing the universal digital card and provisioning the card in the digital wallet of a user's mobile device. The steps for account creation and tokenization may be repeated for each card network the universal card is associated with (e.g., VISA™, MASTERCARD™, AMERICAN EXPRESS™, DISCOVER™, etc.). The resulting accounts may be associated with the single universal digital card. This can allow the universal digital card to be provisioned to work with any card network it is associated with.

Figure 9:
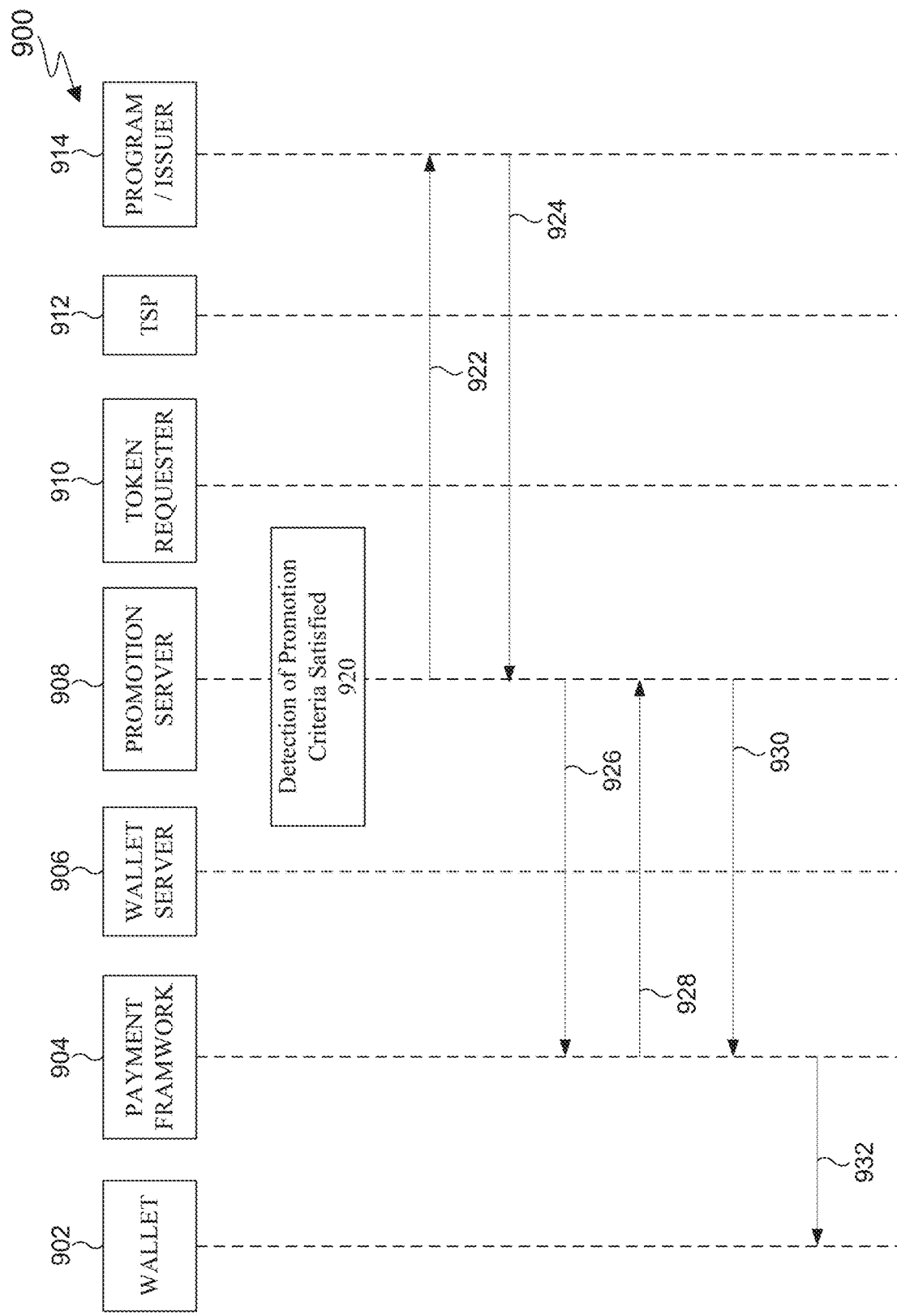
FIG. 9 illustrates a command diagram for a reward sequence in accordance with an embodiment of this disclosure.

FIG. 9 illustrates a command diagram for a reward sequence in accordance with an embodiment of this disclosure. FIG. 9 illustrates command diagram 900 a reward process using a universal digital card, similar to the universal digital card 405a of FIG. 4. Command diagram 900 includes wallet 902, payment framework, 904, wallet server 806, promotion server 908, token requester 910, TSP 912 and program/issuer 914. Command diagram 900 is similar to command diagram 800. However where command diagram 800 illustrates universal card manager 808, command diagram 900 illustrates a promotion server 908. This command diagram 800 is for illustration only and different portions may be rearranged, added, or removed in different embodiments. Additionally, processes within command diagram 800 may occur at separate times, in parallel, simultaneously.

The universal digital card may also be associated with a promotion server which provides monetary funds to the account upon the user satisfying various criteria. Criteria may include registering the universal digital card on wallet 802, making an eligible purchase, referring friends to create and use their own universal digital card, transferring money into the universal digital card account, etc. A promotion server may detect when a criteria is satisfied and notify the universal card manager 808 which may deposit a predetermined amount of monetary funds into the account of the universal digital card. The following processes may occur after the command diagram 800, as the open loop universal digital card is already created.

For example, at 920, promotion server 908 detects a specific criteria is satisfied, which commences the following processes to add monetary finds to the account of the universal digital card. At 922, promotions server 908 notifies program/issuer 914 to add funds to the user's universal digital card. At 924, program/issuer 914 notifies promotion server 908 that fund were successfully added to the user's universal digital card. At 926, promotion server 908, sends a notification to payment framework 904 that finds were added to users account. At 928, payment framework 904 requests the account balance of the universal digital card from promotion server 908. At 930, promotion server 908 transmits to payment framework 904 the universal digital card balance and transaction and associated data. Thereafter, at 932, payment framework 904 transmits to wallet 902 information indicating funds were added to the universal digital card. Wallet 902 then displays the newly updated account balance to the user.

Figure 10:
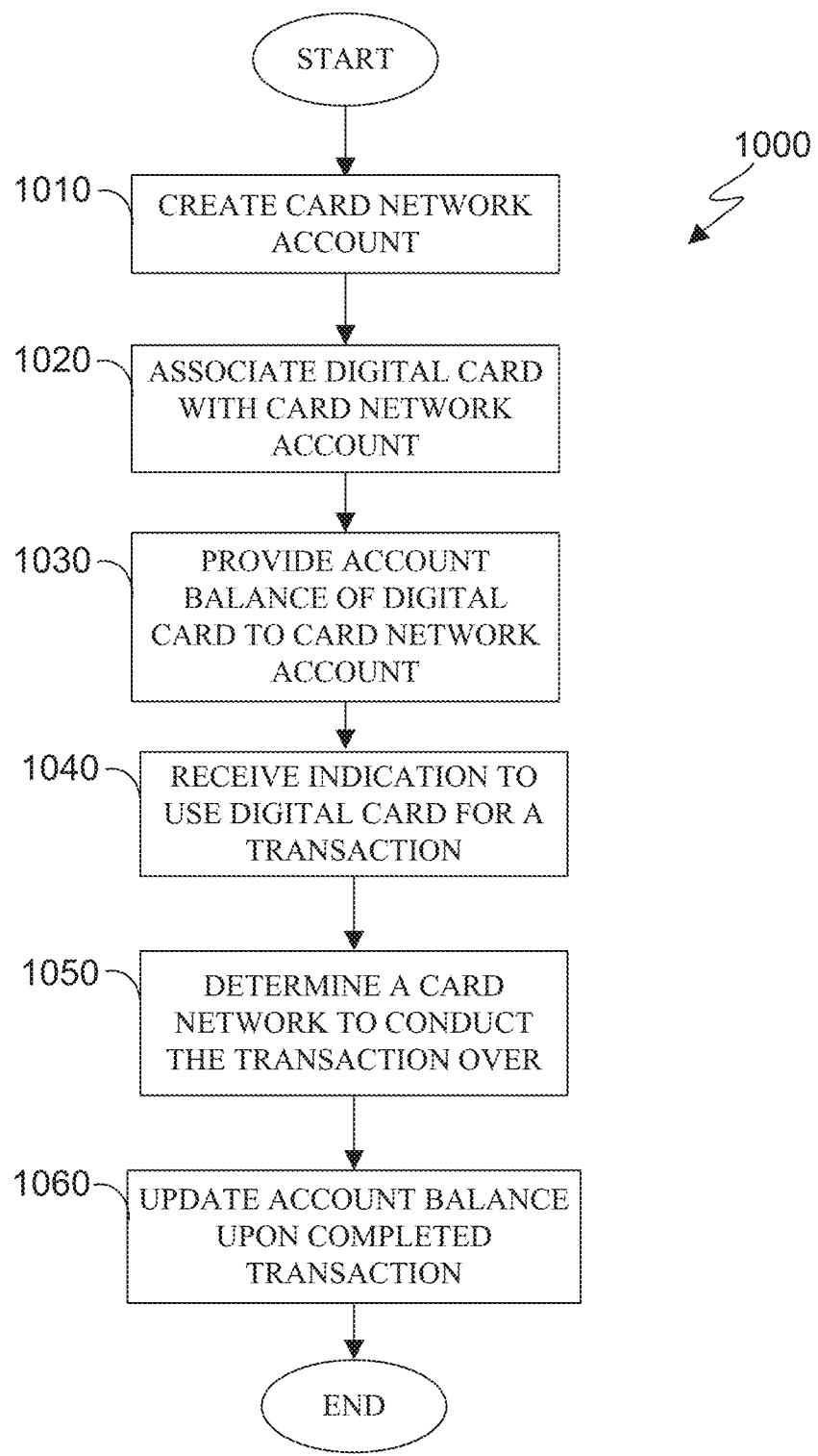
FIG. 10 illustrates a process for payment information management in accordance with an embodiment of this disclosure.

FIG. 10 illustrates a process for payment information management in accordance with an embodiment of this disclosure. The process 1000 depicted in FIG. 10 may be performed by the server 104 of FIG. 1, the server 200 of FIG. 2 or the universal card manager 434 of FIG. 4.

At step 1010, the process 1000 begins with server 200 creating a card network account with each card network. For each card network, server 200 creates an account. For example, if there are four card networks, server 200 creates four card network accounts, one account for each card network.

At step 1020, the universal digital card is associated with each of the created accounts for each card network. In one embodiment, the universal digital card may be similar to the universal digital card 405*a* of FIG. 4. The digital card can be related to a credit card, a debit card bank account or other payment information. The digital card may be associated with more than one card network. The digital card may have an account with each associated card network, per step 1010. In one embodiment steps 1010 and 1020 may be combined as the creation of each user account may automatically be associated with the universal digital card.

At step 1030 the account balance for the universal digital card is provided to at least one card network account (created at step 1010). In one embodiment, the account balance for the digital card may be given to only one of the created card network accounts. In one embodiment, the account balance for the digital card may be given to only two of the created card network accounts. In one embodiment, the account balance for the digital card may be given to any number of the created card network accounts. By providing the card network accounts an account balance of the digital card, the card networks is provided with a maximum spending limit associated with the universal digital card. Therefore, a payment transaction cannot exceed the maximum balance of the account balance.

Figures 11A, 11B, 11C:
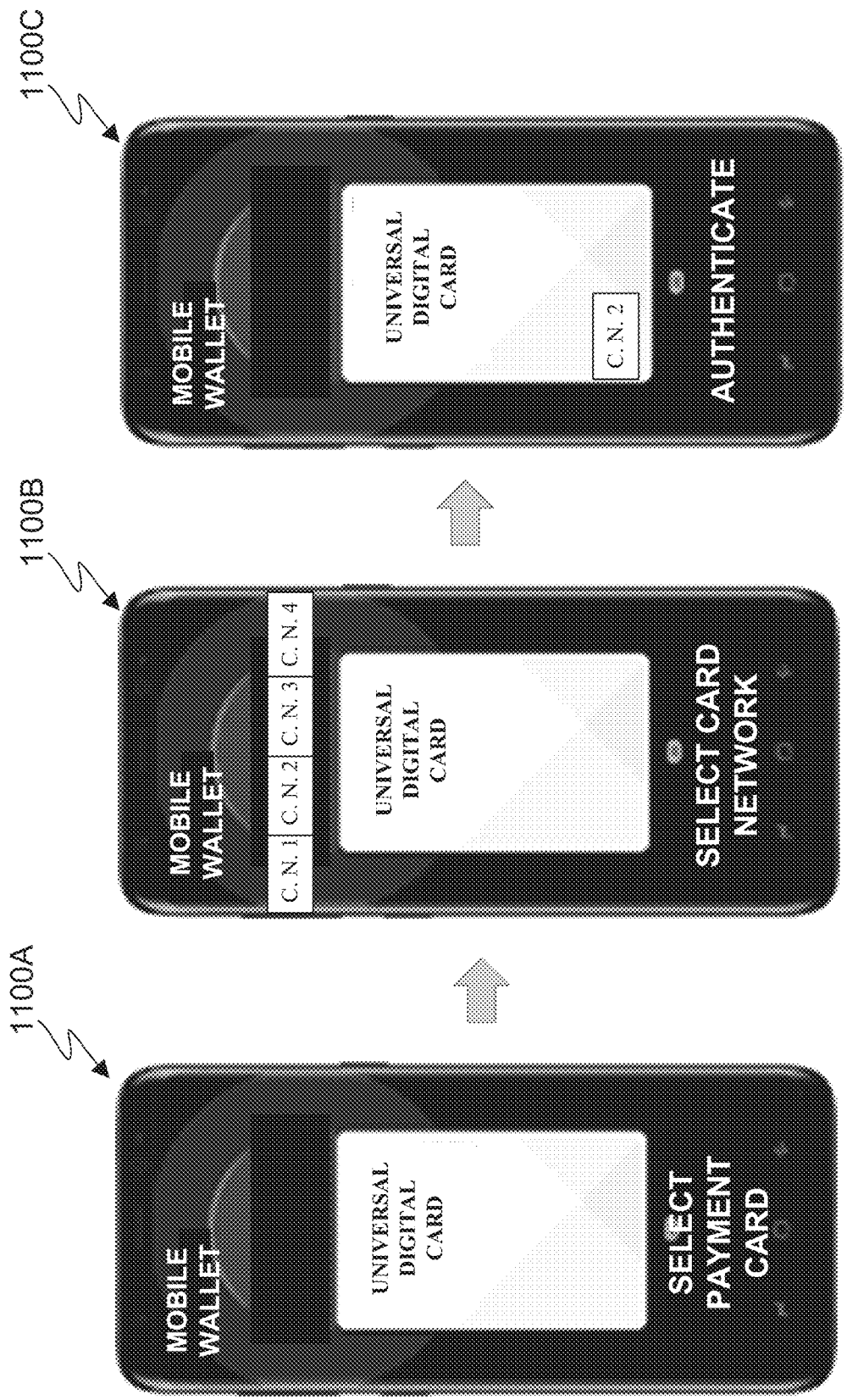
FIGS. 11A, 11B, and 11C illustrate example user interfaces in accordance with an embodiment of this disclosure.

At step 1040, the process 1000 continues with server 200 receiving an indication to use the universal digital card for a transaction. The server receives a notification that on the mobile device the user selected to use the universal digital card. Referring to FIG. 11*a*, smart phone 1100A depicts a mobile device, similar to mobile device 420. Smart phone 1100A illustrates a mobile wallet with the universal digital card selected. In one embodiment mobile wallet may have more than one digital card, allowing a user to select a specific digital card. As depicted in FIG. 11A, mobile wallet on smart phone 1100A has only a single digital card, that of universal digital card. The indication to use a digital card may include a user selecting the universal digital card from a wallet on a mobile device. Server 200 may receive the indication directly and/or indirectly from mobile device. For example, FIG. 11A the universal digital card may conduct a transaction independent of the card network accepted at the POS terminal.

In step 1050, server 200 determines a card network to conduct the transaction over, when utilizing the universal digital card. Server may provide a suggested card network to use when conducting a transaction at a POS terminal. The suggested card network may be determined from the plurality of card networks associated with the universal digital card (per step 1020). For example, FIG. 11B illustrates the universal digital card with access to four card networks (C.N. 1, C.N. 2, C.N. 3, and C.N. 4). Server 200 may select any of the card networks. In one embodiment a user may select a card network. In one embodiment, server 200 may identify a commonly accepted card network and designate that card network as a default and only change the card network, based on an indication that the location does not accept that particular card network. Upon selecting to use the universal digital card for a transaction, server 200 may select a specific card network to conduct the transaction. In one embodiment, the card network may be a default setting precluding the server 200 from selecting a card network. In one embodiment, server 200 may provision location information as well as merchant information. For example, server 200 may utilize location information to derive the location the transaction is to take place. Based on the location information, server 200 may identify the merchant and derive which card networks are associated with a POS terminal at the merchant's retail location. Such information may be based on previous successful transaction of the user and/or other users. If server 200 determines that the POS terminal at the merchant's retail location accepts more than one card network, server 200 may determine which one to use. In one embodiment, server 200 may suggest a more common card network. In one embodiment, server 200 may determine to use a card network based on information indicating one card network is utilized more than another card network. Upon determining a card network to utilize, server 200 notifies mobile device as to which card network to conduct the transaction over. FIG. 11C illustrates the server 200 selecting card network 2, as the card network to be utilized in the upcoming transaction.

In step 1060, upon the successful completion of the transaction, the server 200, updates the account balance. The updated account balance indicates the remaining account balance after the transaction is processed and complete. In one embodiment, the updated account balance may be displayed on mobile device to user.

Although FIG. 10 illustrates an example process for payment information, various changes could be made to FIG. 10. For example, while shown as a series of steps, various steps in each figure could overlap, occur in parallel, occur in a different order, or occur multiple times. For example, steps 1040 and 1050 may be a singular step. Additionally, in one embodiment, step 1040 may not be part of process 1000. Additionally, steps 1010, and 1020, may be combined and/or omitted.

FIGS. 11A, 11B and 11C illustrate example user interfaces in accordance with an embodiment of this disclosure. FIGS. 11A, 11B, and 11C illustrate an exemplary flow for selecting a universal digital card and subsequent card network. FIG. 11A illustrates a user interface where a digital card is selected, in this case the universal digital card. While not shown, the balance of the universal digital card may be displayed with the image of the universal digital card on the user interface. FIG. 11B illustrates an example user interface where a manual selection of a card network can be made. Example card network options are shown as "C.N. 1", "C.N. 2", "C.N. 3", and "C.N. 4". While only four card network options are shown in FIG. 11B, any number of card networks may be displayed. If there are a large number of card networks, various user interface implementations may be utilized to allow a user to scroll through the card network options (e.g., swiping, scrolling, etc.) to select the desired option. In an embodiment that is not shown, unavailable card networks at the location may not be selectable (e.g., greyed out, crossed out, etc.) or available card networks may be highlighted, shown in color, selectable, etc. FIG. 11C illustrates an exemplary user interface showing the selected card, the selected card network and requesting authentication, e.g., biometric authentication, password, PIN, etc.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for universal card acceptance, the method comprising:
   creating accounts with a plurality of card networks, wherein each of the accounts is with one of the plurality of card networks, the plurality of card networks transmit transaction information, and each card network, of the plurality of card networks, represents a payment provider of a plurality of payment providers, respectively;
   linking a digital card to each of the accounts with the plurality of card networks to provide the digital card with access to the plurality of payment providers;
   providing, to at least one of the accounts, an account balance of the digital card;
   receiving, from a mobile device, a selection of the digital card to conduct a transaction;
   in response to receiving the selection of the digital card, identifying a merchant associated with the transaction;
   automatically identifying an accepted card network, from the plurality of card networks to conduct the transaction, wherein the accepted card network is identified based in part on a first payment provider, of the plurality of payment providers, that is accepted at the merchant;
   assigning, to the digital card, the first payment provider that is associated with the accepted card network to conduct the transaction at the merchant; and
   updating the account balance of the digital card on completion of the transaction.

2. The method of claim 1 wherein identifying the accepted card network to conduct the transaction further comprises:
   determining the payment provider from the plurality of payment providers that are accepted at the merchant based at least in part on one of a geographic location of the mobile device or a history of selected card networks at the merchant.

3. The method of claim 1, further comprising:
   providing to each of the accounts the account balance of the digital card;
   dividing the account balance of the digital card among each of the accounts;
   assigning a maximum limit to each of the accounts based on the account balance; and
   reallocating the account balance between the accounts and adjusting the maximum limit based on the updated account balance.

4. The method of claim 1, further comprising:
   assigning a maximum limit to each of the accounts based on the account balance; and
   responsive to processing the transaction, modifying the maximum limit for each of the accounts based on the updated account balance.

5. The method of claim 1, further comprising:
   determining whether an action is performed which satisfies a criteria; and
   increasing the account balance by a determined amount responsive to determining the action satisfies the criteria.

6. The method of claim 1, wherein identifying the accepted card network comprises selecting a default card network associated with the first payment provider for use with the digital card.

7. A electronic device comprising:
   a communication interface; and
   at least one processor coupled to the communication interface, the at least one processor is configured to:
      create accounts with a plurality of card networks, wherein each of the accounts is with one of the plurality of card networks, the plurality of card networks transmit transaction information and each card network, of the plurality of card networks, represents a payment provider of a plurality of payment providers, respectively;

link a digital card to each of the accounts with the plurality of card networks to provide the digital card with access to the plurality of payment providers;
provide to at least one of the accounts an account balance of the digital card;
receive, from the electronic device, a selection of the digital card to conduct a transaction;
in response to receiving the selection of the digital card, identify a merchant associated with the transaction
automatically identify an accepted card network, from the plurality of card networks to conduct the transaction, wherein the accepted card network is identified based in part on a first payment provider, of the plurality of payment providers, that is accepted at the merchant;
assign, to the digital card, the first payment provider that is associated with the accepted card network to conduct the transaction at the merchant; and
update the account balance of the digital card on completion of the transaction.

8. The electronic device of claim 7, wherein to identify the accepted card network, the at least one processor is further configured to:
determine the payment provider from the plurality of payment providers that are accepted at the merchant based at least in part on one of a geographic location of the electronic device or a history of selected card networks at the merchant.

9. The electronic device of claim 7, wherein the at least one processor is further configured to:
provide to each of the accounts the account balance of the digital card;
divide the account balance of the digital card among each of the accounts;
assign a maximum limit to each of the accounts based on the account balance; and
reallocate the account balance between the accounts and adjusting the maximum limit based on the updated account balance.

10. The electronic device of claim 7, wherein the at least one processor is further configured to:
assign a maximum limit to each of the accounts based on the account balance; and
responsive to processing the transaction, modify the maximum limit for each of the accounts based on the updated account balance.

11. The electronic device of claim 7, wherein the at least one processor is further configured to:
determine whether an action is performed which satisfies a criteria; and
increase the account balance by a determined amount responsive to determining the action satisfies the criteria.

12. The electronic device of claim 7, wherein to identify the accepted card network, the at least one processor is further configured to select a default card network associated with the first payment provider for use with the digital card.

13. The electronic device of claim 7, wherein the at least one processor is further configured to determine whether to approve a transaction request based on the account balance for the digital card.

14. The electronic device of claim 7, wherein the at least one processor is further configured to:
receive, from the electronic device, a selected card network for the digital card to conduct the transaction; and
transfer the account balance to the accounts associated with the selected card network.

15. A non-transitory computer readable medium comprising program code that, when executed by at least one processor of a mobile device, causes the at least one processor to:
create accounts with a plurality of card networks, wherein each of the accounts is with one of the plurality of card networks, the plurality of card networks transmit transaction information and each card network, of the plurality of card networks, represents a payment provider of a plurality of payment providers, respectively;
link a digital card to each of the accounts with the plurality of card networks to provide the digital card with access to the plurality of payment providers;
provide, to at least one of the accounts, an account balance of the digital card;
receive, from the mobile device, a selection of the digital card to conduct a transaction;
in response to receiving the selection of the digital card, identify a merchant associated with the transaction;
automatically identify an accepted card network, from the plurality of card networks to conduct the transaction, wherein the accepted card network is identified based in part on a first payment provider, of the plurality of payment providers, that is accepted at the merchant;
assign, to the digital card, the first payment provider that is associated with the accepted card network to conduct the transaction at the merchant; and
update the account balance of the digital card on completion of the transaction.

16. The non-transitory computer readable medium of claim 15, further comprising program code that, when executed by the at least one processor of the mobile device, causes the at least one processor to determine the payment provider from the plurality of payment providers that are accepted at the merchant based at least in part on one of a geographic location of the mobile device or a history of selected card networks at the merchant.

17. The non-transitory computer readable medium of claim 15, further comprising program code that, when executed by the at least one processor of the mobile device, causes the at least one processor to:
provide to each of the accounts the account balance of the digital card;
divide the account balance of the digital card among each of the accounts;
assign a maximum limit to each of the accounts based on the account balance; and
reallocate the account balance between the accounts and adjusting the maximum limit based on the updated account balance.

18. The non-transitory computer readable medium of claim 15, further comprising program code that, when executed by the at least one processor of the mobile device, causes the at least one processor to:
assign a maximum limit to each of the accounts based on the account balance; and
responsive to processing the transaction, modify the maximum limit for each of the accounts based on the updated account balance.

19. The non-transitory computer readable medium of claim 15, further comprising program code that, when executed by the at least one processor of the mobile device, causes the at least one processor to:
determine whether an action is performed which satisfies a criteria; and increase the account balance by a determined amount responsive to determining the action satisfies the criteria.

20. The non-transitory computer readable medium of claim 15, further comprising program code that, when executed by the at least one processor of the mobile device, causes the at least one processor to select a default card network associated with the first payment provider for use with the digital card.

\* \* \* \* \*